(12) United States Patent
Letz

(10) Patent No.: US 9,488,485 B2
(45) Date of Patent: *Nov. 8, 2016

(54) METHOD AND APPARATUS FOR ROUTE SELECTION BASED ON RECORDED AND CALCULATED ROUTES

(71) Applicant: HERE Global B.V., Veldhoven (NL)

(72) Inventor: Dominic Letz, Berlin (DE)

(73) Assignee: HERE GLOBAL B.V., Veldhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 14/818,993

(22) Filed: Aug. 5, 2015

(65) Prior Publication Data

US 2015/0338223 A1    Nov. 26, 2015

Related U.S. Application Data

(63) Continuation of application No. 13/538,414, filed on Jun. 29, 2012, now Pat. No. 9,109,915.

(51) Int. Cl.
*G01C 21/30* (2006.01)
*G01C 21/32* (2006.01)
*G01C 21/34* (2006.01)

(52) U.S. Cl.
CPC ......... *G01C 21/343* (2013.01); *G01C 21/3484* (2013.01)

(58) Field of Classification Search
CPC .............. G01C 21/3484; G01C 21/34; G08G 1/096838; G08G 1/096888
USPC ....... 701/400, 409, 410, 411, 412, 418, 424, 701/425, 532
See application file for complete search history.

(56) References Cited

U.S. PATENT DOCUMENTS

| | | | |
|---|---|---|---|
| 6,098,015 A | 8/2000 | Nimura et al. | |
| 6,212,473 B1 | 4/2001 | Stefan et al. | |
| 6,505,118 B2 | 1/2003 | Chowanic et al. | |
| 6,581,001 B1 | 6/2003 | Katsuka et al. | |
| 6,591,188 B1* | 7/2003 | Ohler | G01C 21/3415 340/990 |
| 7,610,151 B2 | 10/2009 | Letchner et al. | |
| 2005/0288856 A1 | 12/2005 | Uyeki et al. | |
| 2006/0064242 A1 | 3/2006 | Litvack et al. | |
| 2006/0241854 A1* | 10/2006 | Tu | G01C 21/3446 701/416 |
| 2007/0299599 A1 | 12/2007 | Letchner et al. | |
| 2009/0228207 A1 | 9/2009 | Sasano | |
| 2009/0292463 A1 | 11/2009 | Chase | |
| 2010/0082232 A1 | 4/2010 | Lee | |
| 2010/0106414 A1 | 4/2010 | Whitehead | |
| 2010/0211304 A1 | 8/2010 | Hwang et al. | |
| 2011/0313655 A1 | 12/2011 | Litvack et al. | |
| 2015/0177014 A1* | 6/2015 | Hosoi | G01C 21/3461 701/425 |

* cited by examiner

*Primary Examiner* — Jaime Figueroa
(74) *Attorney, Agent, or Firm* — Ditthavong & Steiner, P.C.

(57) ABSTRACT

An approach for generating one or more personalized travel routes based on recorded routes and calculated routes is disclosed. An apparatus and method determines to generate at least one intersection point between at least one calculated route and at least one recorded route, wherein the at least one calculated route and the at least one recorded route include one or more common endpoints, and cause a generation of at least one personalized route by causing a combination of one or more segments of the at least one recorded route with one or more other segments of the at least one calculated route based, at least in part, on the at least one intersection point. The apparatus and method to determine the personalized route can cause a filtering of the at least one recorded route based on at least one filtering criterion to determine one or more candidate recorded routes.

16 Claims, 18 Drawing Sheets

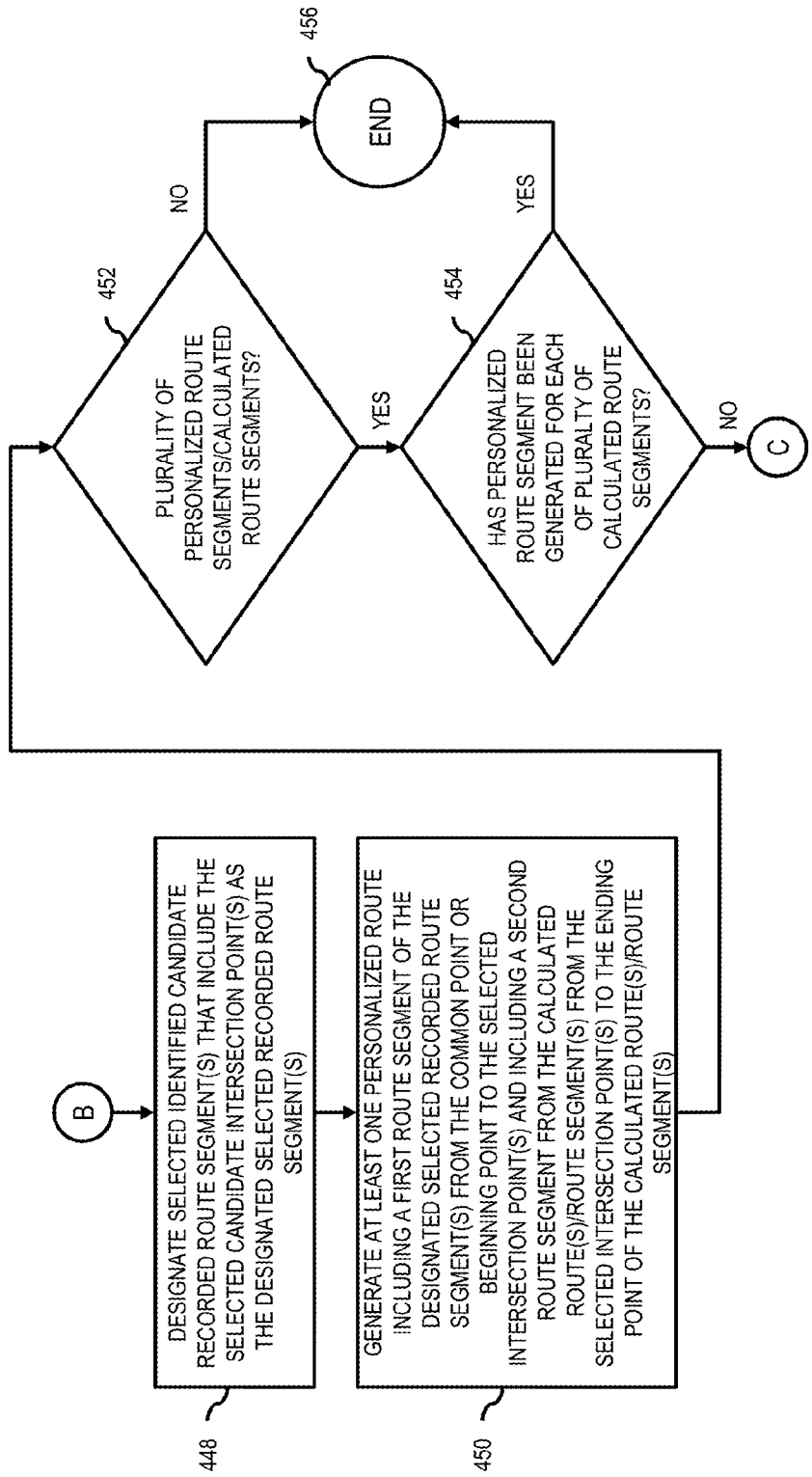

METHOD AND APPARATUS FOR ROUTE SELECTION BASED ON RECORDED AND CALCULATED ROUTES

CROSS REFERENCE TO RELATED APPLICATIONS

This application is a continuation of and claims the right to the benefit of priority under 35 U.S.C. §120 to U.S. patent application Ser. No. 13/538,414, filed Jun. 29, 2012, titled: "METHOD AND APPARATUS FOR ROUTE SELECTION BASED ON RECORDED AND CALCULATED ROUTES," the entire disclosure of which is hereby incorporated by reference in its entirety for all purposes.

BACKGROUND

Service providers and device manufacturers (e.g., wireless, cellular, etc.) are continually challenged to deliver value and convenience to consumers by, for example, providing compelling route planning applications and services. For example, device users often rely upon global positioning system (GPS) technology and complimentary mapping applications to plan routes and determine travel paths for reaching a destination. Typically, the route is determined by the mapping application on the basis of known input, including origin information as supplied by the user or as detected via a GPS sensor of the user device. However, the route calculated by the application often may not match the actual route preferred or traveled by a user. This disparity between the route calculated for a user and the route recorded from a user's commute between the same endpoints (e.g., starting points, waypoints, destinations, etc.) can potentially result in a poorer user experience and/or underutilization of the routing application or service. Accordingly, service providers and device manufacturers face significant technical challenges to providing routes that leverage experience information, such as using learned, recorded routes, such as amassed by the user and/or other users or sources, regarding their travels to enable the generation of a travel route based on a user's driving preferences or experiences.

SOME EXAMPLE EMBODIMENTS

Therefore, there is a need for an approach for generating one or more travel routes based on experience information related to a user's previous learned or recorded routes.

According to one embodiment, a method comprises determining to generate at least one intersection point between at least one calculated route and at least one recorded route, wherein the at least one calculated route and the at least one recorded route include, at least in part, one or more common endpoints. The method also comprises causing, at least in part, a generation of at least one personalized route by causing, at least in part, a combination of one or more segments of the at least one recorded route with one or more other segments of the at least one calculated route based, at least in part, on the at least one intersection point.

According to another embodiment, the method further comprises determining to generate one or more candidate intersection points with respect to the at least one calculated route for one or more candidate recorded routes that include, at least in part, the one or more common endpoints. The method also comprises causing, at least in part, a selection of one of the generated one or more candidate intersection points that intersects the at least one calculated route at a latest point. Further, the method comprises causing, at least in part, a designation of the selected one of the one or more candidate intersection points as the at least one recorded route for the generation of the at least one personalized route.

According to another embodiment, an apparatus comprises at least one processor, and at least one memory including computer program code for one or more computer programs, the at least one memory and the computer program code configured to, with the at least one processor, cause, at least in part, the apparatus to determine to generate at least one intersection point between at least one calculated route and at least one recorded route, wherein the at least one calculated route and the at least one recorded route include, at least in part, one or more common endpoints, and cause, at least in part, a generation of at least one personalized route by causing, at least in part, a combination of one or more segments of the at least one recorded route with one or more other segments of the at least one calculated route based, at least in part, on the at least one intersection point.

According to another embodiment, an apparatus further comprises at least one processor, and at least one memory including computer program code for one or more computer programs, the at least one memory and the computer program code configured to, with the at least one processor, cause, at least in part, the apparatus to determine to generate one or more candidate intersection points with respect to the at least one calculated route for one or more candidate recorded routes that include, at least in part, the one or more common endpoints, cause, at least in part, a selection of one of the generated one or more candidate intersection points that intersects the at least one calculated route at a latest point, and cause, at least in part, a designation of the selected one of the one or more candidate intersection points as the at least one recorded route for the generation of the at least one personalized route.

According to another embodiment, a computer-readable storage medium carries one or more sequences of one or more instructions which, when executed by one or more processors, cause, at least in part, an apparatus to determine to generate at least one intersection point between at least one calculated route and at least one recorded route, wherein the at least one calculated route and the at least one recorded route include, at least in part, one or more common endpoints, and cause, at least in part, a generation of at least one personalized route by causing, at least in part, a combination of one or more segments of the at least one recorded route with one or more other segments of the at least one calculated route based, at least in part, on the at least one intersection point.

According to another embodiment, a computer-readable storage medium carries one or more sequences of one or more instructions which, when executed by one or more processors, cause, at least in part, an apparatus to determine to generate one or more candidate intersection points with respect to the at least one calculated route for one or more candidate recorded routes that include, at least in part, the one or more common endpoints, cause, at least in part, a selection of one of the generated one or more candidate intersection points that intersects the at least one calculated route at a latest point, and cause, at least in part, a designation of the selected one of the one or more candidate intersection points as the at least one recorded route for the generation of the at least one personalized route.

According to another embodiment, an apparatus comprises means for determining to generate at least one intersection point between at least one calculated route and at least one recorded route, wherein the at least one calculated route and the at least one recorded route include, at least in part, one or more common endpoints. The apparatus also comprises means for causing, at least in part, a generation of at least one personalized route by the means causing, at least in part, a combination of one or more segments of the at least one recorded route with one or more other segments of the at least one calculated route based, at least in part, on the at least one intersection point.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 4A-4D are flowcharts of processes for generating one or more personalized travel routes based on calculated and recorded route experience information related to one or more users, according to various embodiments;

DESCRIPTION OF SOME EMBODIMENTS

Figure 1A:
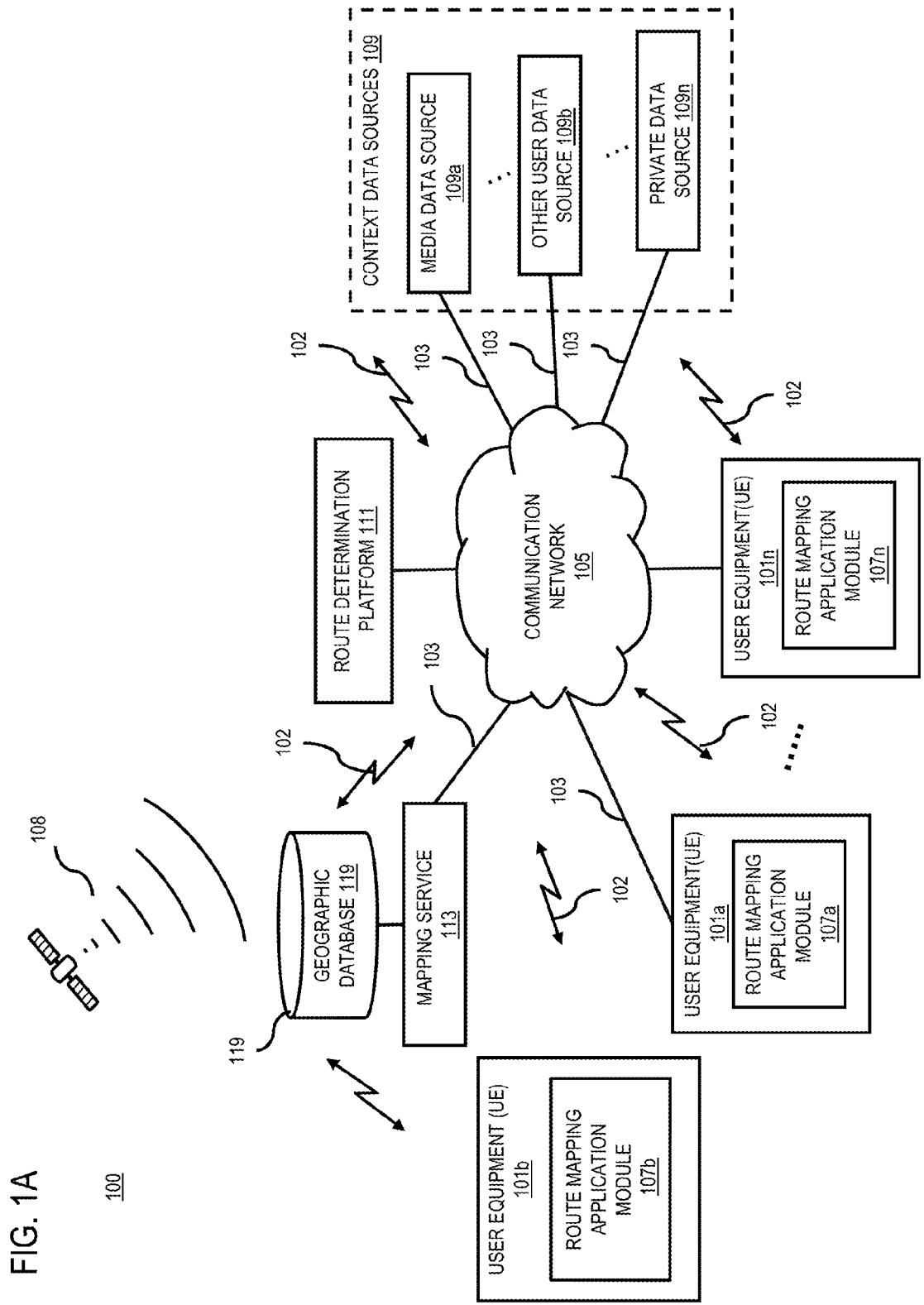
FIG. 1A is a diagram of a system capable of generating one or more travel routes based on calculated and recorded route experience information related to one or more users, according to one embodiment.

Examples of a method, apparatus, and computer program for generating one or more personalized routes for travel based on calculated and recorded route experience information are disclosed. In the following description, for the purposes of explanation, numerous specific details are set forth in order to provide a thorough understanding of the embodiments of the invention. It is apparent, however, to one skilled in the art that the embodiments of the invention can be practiced without these specific details or with an equivalent arrangement. In other instances, well-known structures and devices are shown in block diagram form in order to avoid unnecessarily obscuring the embodiments of the invention.

Although various embodiments are described with respect to routing applications, it is contemplated that the approach described herein can be used with any mapping application, destination planning service, location based system, or any other utility for generating routes, maps, travel directions and data regarding various points of interest. A point of interest can include, for example, any data for indicating a location of a venue, object, person or other item. It is noted that one or more points of interest (POIs) can be specified in connection with routing information as generated by a routing application for denoting items of interest to a user, i.e., landmarks, historic highways, special buildings, activities, parks, restaurants.

The methods and apparatus and systems of the exemplary embodiments generally relate to the field of route planning and navigation, and can have applicability to driving, pedestrian and public transport route planning, for example. However, the exemplary embodiments and disclosure should not be construed in a limiting sense, and can have various applications, such as in relation to digital mapping, digital route planning, turn by turn navigation, as well as to a "personal network" concept, for example.

Digital route planning has traditionally been used by consumers or users devices capable of receiving and generating navigation information, such as in turn by turn systems to get to various destinations. For example, with the introduction of real time traffic information into those systems, it has become more typical for the users to use turn by turn systems and digital route planning also during their daily drives (e.g. commutes). However, one likely disadvantage of the user using a digital route planning system in an area the user knows very well is that typically the digital route planning system can calculate routes different from what the user prefers driving.

In this regard, such as in urban and commuter areas, it can be typical that users of navigation devices can tend to have different personal route preferences, which typically cannot be matched or substantially duplicated by digital route planning systems without prior knowledge. While there have been attempts at improving general digital route planning by learning from the users, however, such "learning" or knowledge, typically can be in the form of improving digital route calculation based on how many users drive on which streets, for example. To address needs in this regard, the methods, apparatus and systems of the exemplary embodiments and disclosure, relate to, for example, determining one or personalized routes or personalized route segments by combining the "personal network" concept with real time route determinations or calculations, such as by utilizing digital route planning in conjunction with recorded user routes, as can be in conjunction with user preferences or context information.

FIG. 1 is a diagram of a system 100 capable of generating one or more personalized routes for travel based on calculated and recorded route experience information related to one or more users, according to exemplary embodiments. In other words, the system 100 merges traditionally digital route planning (e.g., calculated routes) with recorded routes that may indicate differences from the calculated route. For example, when starting from a well known location (e.g., a home location), a user may have a favorite route segment, road, exit, etc. that the user prefers even if route calculation indicates that the user's choice is not the optimal choice according to traditional routing criteria (e.g., fastest time, shortest distance, etc.).

As previously discussed, with the introduction of real-time traffic information, a common scenario is for a commuter to use navigation and mapping applications during daily commutes to for situational awareness of traffic conditions, accidents, weather, etc. that may occur along the user's planned route even when the commuter knows the route to the intended destination well. When the calculated route generated by the application does not match the actual travel route, the situational awareness information (e.g., traffic, estimated time of arrival, etc.) may not be accurate. This problem is particularly applicable in urban or commuter areas where there are many different paths or routes between any two or more endpoints. In various embodiments, the system 100 enables the combining of calculated routes with recorded routes with recorded routes for individual users to generate personalized routes.

In one embodiment, the system 100 determines requests from routing information between specified endpoints, and then determines whether there are recorded routes originating from or terminating at the specified endpoints. At the same time, the system 100 may perform real-time route calculations using traditional routing algorithms to determine one or more calculated routes. The system 100 then determines one or more intersection points between the recorded routes and calculated routes. The intersections points provided connection points for combining the recorded and calculated routes. For example, if the recorded route and a calculated originate from the same starting or beginning point, the system 100 can determine the latest intersection point (e.g., the intersection point furthest from the starting point, or closest to the destination). Then, they system 100 connects the portion of the recorded route from the starting point to the latest intersection point with the portion of the calculated route from the latest intersection point to the destination to generate a combined or personalized route. In some embodiments, the system 100 may select the intersection point for combining based on criteria other than the latest point.

In addition, the system 100 may filter or select for recorded routes based on contextual information of the user. For example, contextual information may indicate a purpose or category of the planned travel such as whether the travel is for pleasure, work, shopping, etc. Each context or category, for instance, can be associated with different respective recorded and calculated routes. In other embodiments, the system 100 may filter or select for recorded routes based on characteristics of the recorded route such as age or frequency. For example, older routes may not reflect user preferences as accurately as new routes. Similarly, more frequently traveled routes may more accurately reflect user preference than less frequently traveled routes. Accordingly, the system 100 can apply various selection or weighting schemes or algorithms to determine which recorded routes or route segments to select for generating a personalized route for the user.

By way of example, the system 100 enables experience information, such as previously recorded routes traveled by a user between one or more endpoints, to be utilized in conjunction with determination of personalized routes or personalized route segments, according to exemplary embodiments, for example. In one embodiment, experience information may also include geotagged photos, pictures, videos, documents, audio files, audio streams, and other data that indicate routes or route segments that have been traveled by a user for one or more personalized routes, for example. Also, the experience information can include other types of contact information, such as in relation to an individual, entity or POI located or living at a place, location or position near a route or route segment, for example. As such, contact information and experience information can be of any of various sources or types and should not be construed in a limiting sense. In addition, the system 100 enables the calculated and recorded route experience information to be rendered for display to a user of a mapping application or routing service as representative of or in addition to one or more points of interest. Experience information is maintained by various context data sources 109 made available by one or more users, one or more content providers, one or more media outlets, one or more retailers, or a combination thereof. The context data sources 109 are designated for access by an experience based routing determination platform 111 according to on one or more access policies established between the requesting user, one or more other users, a provider of the route determination platform 111, the one or more media outlets, the one or more content providers, or a combination thereof.

Users of computing devices such as tablet computers, laptops and cell phones often rely on mapping applications and route planning services to fulfill their location determination or route planning needs. By way of example, device users can access an online mapping service (e.g., Google Maps, MapQuest) in order to determine directions from a point of origin to a destination. As another example, some user devices are equipped with global positioning system (GPS) technology and complimentary mapping applications that enable users to plan routes, execute turn-by-turn directions and/or determine optimal travel paths for reaching a given destination. Typically, the mapping application or routing service is configured to determine the shortest route from a designated point of origin to the destination. In other instances, the user can require that the application or service generate routes featuring the least number of tolls or highways, enables the quickest time to completion, accommodates a given mode of user transport (e.g., train, bus or car), etc.

In certain embodiments, one or more experience types, in relation to context information, can be selected by a user for filtering aggregated experience information maintained by one or more data sources 109 in conjunction with determination of personalized routes, according to exemplary embodiments. It is noted that the data sources 109 can be pulled from, accessed by, or referenced by the route determination platform 111 in accordance with any known data mining and exchange protocols, languages and network methodologies. Also, the experience information can be retrieved on the basis of context information related to a user or their user equipment 101. For example, time, location and position data relative to the UE 101 as well as activity information regarding the user can be processed by the platform 111 for affecting the experience information retrieval process. As such, the context information relative to the current moment of user travel or need is determined in addition to the desired experience type. It is noted that the experience information as gathered by the platform 111 can be historical, current, or a combination thereof.

The system 100 includes an experience based route determination platform 111 that is configured to enable the retrieval of experience information relative to a user request for routing information in determination of personalized routes, in accordance with exemplary embodiments. In addition, the experience based route determination platform 111 provides a functional and operational interface between one or more context data sources 109 for maintaining experience information, one or more mapping services 113 for generating routing information in connection with a mapping application, such as in route mapping application module 107a-n on UE 101a-n, or a combination thereof. By way of example, the experience based routing platform 111 is able to receive and interpret requests for routing information as input via the one or more mapping applications of the route mapping application module 107a-n operable by one or more user devices (i.e., user equipment (UE) 101a-n) on the basis of a selected experience type, such as user route preference in recorded route information for user previously used routes, or other context information, for example. Also, according to exemplary embodiments, the route determination platform 111, and its corresponding functions, modules and storage, can be included in the user device UE 101a-n, such as on a mobile phone, for example. The request can include, for example, an input for representing an origin, a destination, a point of interest (POI), a travel modality (e.g., transport type), a travel condition (e.g., preferred arrival time, preferred road type), or other user specified criteria. The route determination platform 111 then processes this input along with the user selected experience type in order to determine one or more personalized routes, based on calculated route information and recorded route information, as can be filtered by context information, such as POIs and/or experience information best suited for or representative of the request for a route. Based on this determination, the experience based route determination platform 111 thus enables the mapping application of the route mapping application module 107a-n and/or associated mapping service 113 to render an optimized output for one or more personalized routes to fulfill the route request.

By way of example, the optimized output rendered to the user of the mapping application of the route mapping application module 107a-n at a device UE 101a-n can include routing information representative of the selected experience type, such as previously recorded routes as to user route preference. In certain embodiments, the optimized route output can also be filtered to provide personalized route information that can include one or more POIs and/or the experience information related to the selected experience type, including one or more defined themes, or user preferences, such as user shopping or fuel destination in personalized route determination. More specifically, the output as rendered to a display of UE 101a-n via the mapping application of the route mapping application module 107a-n enables the requesting user to traverse, visit or otherwise "experience" the various POIs corresponding to the experience information, such as can be retrieved from context data sources 109a-109n, for example. Routing information can include, for example, directions, maps, images representative of various landmarks, waypoints, coordinates and other data for traversing a given geographical terrain from an origin to a destination. The routing information can also include, based on a user selected level of granularity, an image or map representative of a general area, region or location.

In certain embodiments, the one or more context data sources 109 are repositories maintained by different entities or parties. As noted previously, experience information at the various context data sources 109 can be organized according to one or more themes—i.e., descriptors or categories of experience information for denoting a particular experience type or context, for example. By way of example, the mapping application of the route mapping application module 107a-n can serve as a data source by providing one or more user preferences, recorded routes, or other as experience information, for example. Also, the user can store the experience data to a private data source 109n. Similarly, other user data 109b can be provided by one or more other users, such as other users of the UE 101a-n, such as information and data as to past travels relative to a given location. The data sources 109 provided by the one or more users can be specified according to one or more access settings, such as for personalized route determination, maintained by the route determination platform 111, for example.

Still further, a content provider or media outlet can store media data source items 109*a* such as videos, audio streams, pictures, and images regarding various POIs or user preferences, corresponding to a given location or locations as can be used for context information in determining personalized routes, for example. For example, images of one or more statues, buildings or parks can be maintained by a travel site, photo sharing site, news/media outlet, information bureau or other data source available to the route determination platform 111 in relation to context information in determination of one or more personalized routes, for example. By way of example, location information pertaining to the UE 101*a-n* can be analyzed to determine whether the user is within proximity to the park, such as if the user preference is to travel a route near such park, for example. The experience based routing platform 111 enables a user requesting routing information to further refine the experience type based on the relationship between the user and the various data sources.

It is noted that the data provided by the context data sources 109*a*-109*n* can be stored to include various metadata. The metadata can provide additional information regarding the media or content, including temporal data (e.g., a timestamp), activity data (e.g., a name of a venue), location data (e.g., coordinates, zip code, network address), user/publisher information (e.g., name of a provider of the data), etc. In addition, the metadata can also specify a defined theme under which the experience information can be categorized, such as for context filtering to determine one or more personalized routes, according to exemplary embodiments. As such, the experience type can be correlated with one or more themes for organizing the various experience information for correlation with one or more experience types, for example.

Hence, the metadata enables the routing platform 111 to filter the broad array of available experience information at the various data sources 109*a*-109*n* according to the selected experience type. Context information can also be used to filter and retrieve experience information accordingly or to identify relevant POIs based on a determined user and/or device context, as can be used in personalized route determination, for example.

The experience based route determination platform 111 enables execution of various algorithms for generating routing information in connection with associated POI data, experience information, mapping information, routing data generated by the mapping service 113 and the like, as can be used in conjunction with calculated and recorded route information to determine one or more personalized routes or route segments. Algorithmic executions performed can include, for example, a processing of user specified input for enabling the gathering/retrieving of route or other experience information from the various context data sources 109. Another execution can include a processing of input for generating one or more suggested and/or optimal routes, such as based on one or more calculated routes and recorded routes, for example, according to exemplary embodiments. It is noted that the executions for determination of one or more personalized routes or route segments can be performed in connection with or independent of one or more processing techniques of the mapping service 113 or mapping application of the route mapping application module 107*a-n* on the UE 101*a-n*, as well as can be performed, at least in part, by the UE 101*a-n*, for example. It is noted that the origin and destination inputs can be one of the various POIs returned pursuant to a route request, along with various other locations, objects, venues, landmarks, etc., for example.

As shown in FIG. 1, the system 100 comprises one or more user equipment (UE) 101*a-n* (also collectively referred to as UEs 101) having connectivity to or communication with the mapping service platform 113, a geographic database 119, the route determination platform 111, and the context data sources 109 via a communication network 105, such as through one or more of wireless 102, cable or wired 103, or satellite 108 communications, or combinations thereof, for example. The UEs 101 also have connectivity to the route determination platform 111 that can provide mapping and/or location-based services in relation to personalized route determination. In one embodiment, the route determination platform 111 in conjunction with the geographic database 119, as well as in conjunction with the context data sources 109, can interact with the UEs 101 to provide mapping information or user generated context or preference information for determination or one or more personalized routes or route segments, according to exemplary embodiments. Also, according to exemplary embodiments, as described, the UEs 101, such as a mobile phone, can perform and include the functions, modules and storage of the route determination platform 111. And, as such, the route determination platform 111, according to exemplary embodiments, can be "onboard" the UEs 101, for example. Where the route determination platform 111 is effectively "onboard" the UEs 101, such as being associated with or incorporated into the route mapping application module 107*a-n*, connectivity with an external route determination platform 111 would typically not be needed or required, according to exemplary embodiments, for example.

In one embodiment, the UEs 101 can contain one or more route mapping application modules 107*a-n*, that can include one or more mapping/location-based applications as can be used, at least in part for calculated and recorded route information, as well as filtering and context information, for determination of one or more personalized routes or route segments, according to exemplary embodiments. The mapping/location-based applications of the route mapping application module modules 107*a-n* can enable the UEs 101*a-n* to access mapping information, recorded route information, or user preference context information, for example, determined or provided by the system 100 and subsequently provisioned by the mapping service 113, such as in conjunction with the geographic database 119. By way of example, the mapping service platform 113 together with the geographic database 119, as well as the route determination platform 111 and context data sources 109 can exist independently or within a cloud computing and/or cloud storage platform, for example, according to exemplary embodiments.

As discussed, the system 100 comprises a user equipment (UE) 101*a-n* having connectivity to the route determination platform 111 via a communication network 105, and to other components of the system 100. However, as described, where the route determination platform 111 is effectively "onboard" or included in the UEs 101, such as associated with or incorporated into the route mapping application module 107*a-n*, connectivity with an external route determination platform 111 would typically not be needed or required, according to exemplary embodiments, for example. By way of example, the communication network 105 of system 100 can includes one or more networks such as a data network, a wireless network, a telephony network, or any combination thereof. It is contemplated that the data network can be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network can be, for example, a cellular network and can employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UEs 101 can be any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UEs 101 can support any type of interface to the user (such as "wearable" circuitry, etc.).

By way of example, the UEs 101, the mapping service platform 113 and associated geographic database 119, the route determination platform 111, and the context data sources 109 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

In one embodiment, the UEs 101, the mapping service platform 113 and associated geographic database 119, the route determination platform 111 and the context data sources 109 can interact according to a client-server model, for example. It is noted that the client-server model of computer process interaction is widely known and used. According to the client-server model, a client process sends a message including a request to a server process, and the server process responds by providing a service. The server process can also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others.

Figure 1B:
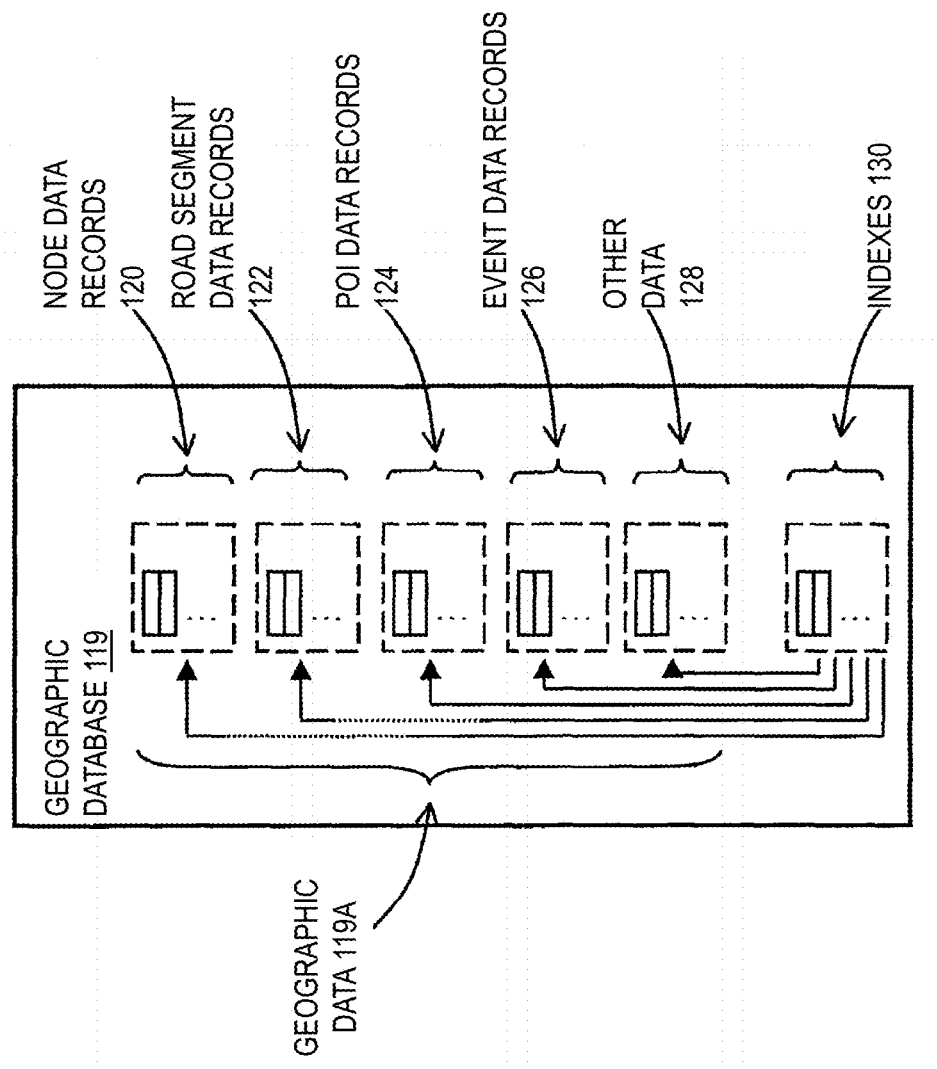
FIG. 1B is a diagram of a geographic database, such as can be included in the system of FIG. 1A, according to one embodiment.

FIG. 1B is a diagram of geographic database 119 of system 100, according to exemplary embodiments. In the exemplary embodiments, generated POIs, event data, context information, or recorded route data can be stored, associated with, and/or linked to the geographic database 119 or data thereof. In one embodiment, the geographic or map database 119 includes geographic data 119A used for (or configured to be compiled to be used for) navigation-related services, such as for personalized route determination, according to exemplary embodiments. For example, the geographic database 119 includes node data records 120, road segment or link data records 122, POI data records 124, event data records 126, and other data records 128, for example. More, fewer or different data records can be provided. In one embodiment, the other data records 128 include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example.

In exemplary embodiments, the road segment data records 122 are links or segments representing roads, streets, or paths, as can be used in the calculated route or recorded route information for determination of one or more personalized routes, according to exemplary embodiments. The node data records 120 are end points corresponding to the respective links or segments of the road segment data records 122. The road link data records 122 and the node data records 120 represent a road network, such as used by vehicles, cars, and/or other entities. Alternatively, the geographic database 119 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 119 can include data about the POIs and their respective locations in the POI data records 124. The geographic database 119 can also include data about places, such as cities, towns, or other communities, and other geographic features, such as bodies of water, mountain ranges, etc. Such place or feature data can be part of the POI data 124 or can be associated with POIs or POI data records 124 (such as a data point used for displaying or representing a position of a city). In addition, the geographic database 119 can include data about location-based events and their respective locations in the event data records 126. By way of example, the location-based events can include any type of event that is associated with a particular location including, for instance, traffic, accidents, construction, public gatherings, etc., as can be used as context information for personalized route determination, according to exemplary embodiments.

The geographic database 119 can be maintained by the content provider in association with the mapping service platform 113 (e.g., a map developer). The map developer can collects geographic data to generate and enhance the geographic database 119. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database 119 can be a master geographic database stored in a format that facilitates updating, maintenance, and development. For example, the master geographic database 119 or data in the master geographic database 119 can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a UE 101*a-n*, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

As mentioned above, the geographic database 119 can be a master geographic database, but in alternate embodiments, the geographic database 119 can represent a compiled navigation database that can be used in or with end user devices (e.g., UEs 101) to provided navigation-related functions. For example, the geographic database 119 can be used with the end user device 101 to provide an end user with navigation features. In such a case, the geographic database 119 can be downloaded or stored on the end user device UE 101*a-n*, such as in the route mapping application module 107*a-n*, or the end user device UE 101*a-n* can access the geographic database 119 through a wireless or wired connection (such as via a server and/or the communication network 105), for example.

In one embodiment, the end user device or UE 101*a-n* can be an in-vehicle navigation system, a personal navigation device (PND), a portable navigation device, a cellular telephone, a mobile phone, a personal digital assistant (PDA), a watch, a camera, a computer, and/or other device that can perform navigation-related functions, such as digital routing and map display. In one embodiment, the navigation device UE 101*a-n* can be a cellular telephone. An end user can use the device UE 101*a-n* for navigation functions such as guidance and map display, for example, and for determination of one or more personalized routes or route segments based on one or more calculated and recorded routes, according to exemplary embodiments.

Figure 2:
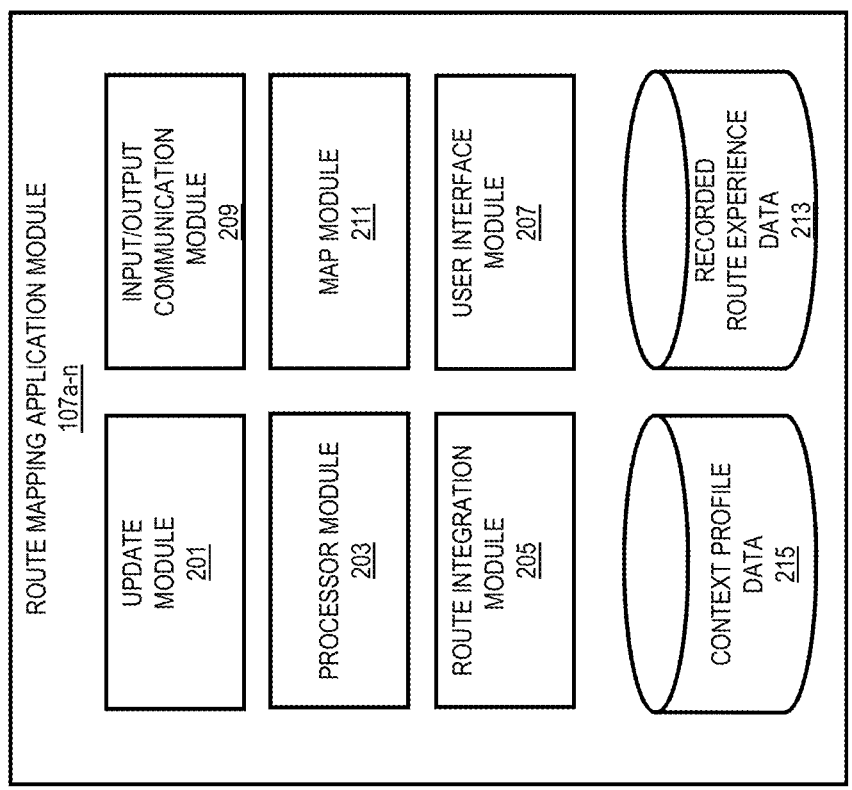
FIG. 2 is a diagram of a route mapping application module, such as can be included system of FIG. 1A, according to one embodiment.

FIG. 2 is a diagram of the components of the route mapping application module 107*a-n*, as can be used in the determination of one or more personalized routes or personalized route segments, according to exemplary embodiments. By way of example, the route mapping application module 107*a-n* of the user equipment 101*a-n* can include one or more components for generating one or more calculated routes and calculated route segments and recorded routes and recorded route segments, as well as can perform filtering, and can generate one or more personalized routes or route segments, according to exemplary embodiments. It is contemplated that the functions of these components can be combined in one or more components or performed by other components of equivalent functionality in the system 100, for example. In this embodiment, the route application mapping module 107*a-n* can include, for example, an update module 201, a processor module 203, a route integration module 205, an input/output communication 209, a map module 211 and a user interface module 207. Also, according to exemplary embodiments, as described, the UEs 101, such as a mobile phone, can perform and include the functions, modules and storage of the route determination platform 111, such as associated with or incorporated into the route mapping application module 107*a-n*, for example.

In addition, the route mapping application module 107*a-n* can access context profile data regarding one or more users, as described, as can be used for filtering in determination of the personalized routes from a context profile data storage database 215. The route mapping application module 107*a-n* also can maintain one or more recorded route experience data storage database 213 for storing previously recorded routes or route segments of a user or users for determining various of the candidate recorded routes or candidate recorded route segments for determining one or more personalized routes or personalized route segments, according to exemplary embodiments.

In one embodiment, the update module 201 can update user identification information associated with a user or users of the UE 101a-n and can also authenticate users and user devices UE 101a-n, such as for interaction with the route determination platform 111, or module, for determination of one or more personalized routes or route segments. By way of example, the update module 201 can receives a request, such as from a user of the UE 101a-n through the input/out communication module 209 to generate mapping information based on one or more inputs provided by a mapping application, such as can be stored in the map module 211, or can be obtained from the mapping service 113 and associated geographic database 119 for determination of one or more personalized routes or route segments, according to exemplary embodiments. The filtering criteria in a process for generation of the one or more personalized routes or personalized route segments can include a specification of data or data sources for context information as can be obtained from the context profile data storage database 215, as well as can include various preferences and settings information for one or more users of user devices UE 101a-n, including a preferred travel mode, relationship type, default origin and destination, etc., for example. Also, recorded routes and route preferences as can be used in the determination of the personalized routes and personalized route segments, for one or more users of user devices UE 101a-n, can be stored in the recorded route experience data storage database 213, for example. These preferences and settings can be referenced to a specific user of a UE 101a-n, or a specific user device UE 101a-n, or combination thereof, for example.

The update module 201 can also include receiving and validating a login name and/or user identification value as provided or established for a particular user (or host), such as in conjunction with a subscription or registration process with a provider of the route determination platform 111, such as in relation to a personalized route or personalized route segment determination process, according to exemplary embodiments. The login name and/or user identification value can be received as an input provided by the user from UE 101a-n via a graphical user interface, and as can be provided to the route determination platform 111 (e.g., as enabled by user interface module 207 through the input/output communication module 209). The input/output communication module 209 can enable communication of the route application mapping module 107a-n with other components of the user device UE 101a-n, as well as with other components of the system 100, such as the route determination platform 111, for example. The authentication or user identification process can also be performed through automated association of profile settings maintained as registration data with an IP address, a carrier detection signal of a user device, mobile directory number (MDN), subscriber identity module (SIM) (e.g., of a SIM card), radio frequency identifier (RFID) tag or other identifier, such as for communication of the user device UE 101a-n with other components of the system 100, such as the route determination platform 111.

In one embodiment, the update module 201 or input/output communication module 209 can provides input to the processor module 203 in relation to determining one or more personalized routes or personalized route segments. The processor module 203 can determine one or more inputs required for enabling execution of processes for determining one or more personalized routes or personalized route segments including, for example, retrieving map information from the map module 211, recorded route information from the recorded route experience data storage database 213, or context profile data, as can be used for filtering, from the context profile data storage database 215. The processor module 203 can provide information or receive information on the recorded routes from the recorded route experience data storage database 213, and the desired one or more beginning and ending points for the to be determined personalized routes or personalized route segments, such as received from the input/output communication module 209 or from the user interface module 207, to the route integration module 205. The route integration module 205 can also receive map information from the map module 211 for determination of the recorded and calculated routes.

The route integration module 205 can, alone or in conjunction with the processor 203, integrate recorded routes having common endpoints with the desired one or more beginning and ending points for determination of candidate routes or candidate route segments. The route integration module 205 can enable the generated routing information to be integrated for use with the mapping application of the route mapping application module 107a-n or the mapping service 113, including the executing of various application programming interfaces (APIs) required of the mapping application, for example. The processor 203 can, alone or in or in conjunction with the route integration module 205 determine candidate recorded routes or candidate recorded route segments and one or more calculated routes or calculated route segments, and apply any filtering criterion or criteria to determine the one or more personalized routes or personalized route segments, according to exemplary embodiments. The filtering criterion or criteria can include, for example, one or more of age of the recorded route, the frequency of travel of the recorded route, or the context of the at least one recorded route, such as based on the recorded route including or meeting context information criteria, according to exemplary embodiments.

The route mapping application module 107a-n, such as by the processor 203, can also obtain recorded route, route preference, mapping, geographic and context information from other components of the system 100 for the personalized route or personalized route segment determination, such as though the input/output communication module 209, or in conjunction with user interface module 207. Exemplary sources in the system 100 for providing recorded route, route preference, mapping, geographic and context information, can be obtained such as from the route determination platform 111, the mapping service 113 and associated geographic database 119 or from the context data sources 109, such as via the communication network 105, for example. The input/output communication module 209 can relay information and data from and to components of the system 100 and from and to the processor module 203, which can use the received data and information in the determination of the personalized routes or personalized route segments, as described, for example.

Also, according to exemplary embodiments, the determination of the personalized routes or personalized route segments can be determined by the UE 101a-n alone or in conjunction with various components of the system 100, such as by or in conjunction with the route determination platform 111, with the route determination platform 111 receiving information, as described, from the user device UE 101a-n and from other components of the system 100, such as the mapping service 113 and associated geographic database 119 or from context data sources 109, such as via the communication network 105, for example.

In addition to retrieving recorded route experience information and context information, the processor 203 is configured to generate personalized route information based on user input conditions or criteria, such as user route preferences or point of interest data, for example, such as received from the user interface module 207 through the update module 201 from the input/output communication module 209. Such user input criteria or conditions can include, for example, one or more experience types, returned theme data corresponding to the experience types, user route preferences, select experience information, the desired origin or origins or beginning points, intermediate destinations or intermediate ending points, the destination or ending points, or a combination thereof, or other criteria or conditions, for example.

Routing information as generated by the processor 203 can include one or more instructions for guiding the user from or to various points of interest (POIs) along the determined personalized routes or personalized route segments, such as in relation to corresponding one or more filtering criteria. In addition, the processor 203, such as in conjunction with the map module 211 or the route integration module 205, can generate mapping information for visually depicting the routing information, such as for the personalized routes or personalized route segments, as well as for the calculated routes, calculated route segments, recorded routes or recorded route segments, as juxtaposed against geographic data or in relation to POIs, such as for presentation on a display of a user device, such as on a display of UE 101a-n, for example, according to exemplary embodiments.

Still further, the processor 203 can be configured to process metadata associated with any experience information maintained by the various data sources, such as can be used in conjunction with filtering criteria. The metadata can be interpreted by the processor 203 to determine contextual data associated with the one or more user preferences or POIs, for example. For example, timestamp information related to recorded route information can be interpreted by the processor 203 for determining the most relevant/up-to-date recorded routes or recorded route preferences, such as can be correlated with a restaurant as a point of interest along a personalized route or personalized route segment, or as an ending point of a personalized route or personalized route segment, for example. By determining the contextual data, older recorded routes or older recorded route segments, such as to the restaurant, can be avoided for retrieval, while those with a more recent timestamp can be retrieved, according to exemplary embodiments.

In yet another embodiment, the processor 203 in conjunction with the context profile data storage database 215 can gather point of interest data determined to relate to the personalized routing request. This can includes generating a correlation between the POIs and experience information, as well as enabling determining of POIs in connection with a given mapping application or service, for example. In addition, the processor 203 can be configured to process contextual information as monitored for the user, one or more other users, or various user devices UE 101a-n associated therewith, such as a user's cell phone, personal computer, or received from other components of the system 100, for example. Depending on the context information, one or more POIs can be added to or subtracted from a collection of POIs correlated with one or more desired or recorded routes, for example.

It is noted, in certain embodiments, that the functions performed by the various components of the route mapping application module 107a-n can be incorporated, such as those of the processor 203 and the route integration module 205, for example. Furthermore, the process of retrieving POI data or retrieving correlated experience information can be performed concurrently with the retrieval of recorded route information, for example, in the determination of the personalized routes or personalized route segments, for example. Regardless of the implementation, the processor 203 and other components of the route mapping application module 107a-n can employ any known data mining and exchange protocols, languages and network methodologies for pulling from, accessing or referencing information as stored, either on the user device UE 101a-n or on other components of the system 100, for example. In addition, the processor 203 can interact with the user interface module 207 to enable the pushing, posting, uploading, or correlating of one or more data items to a data source, such as in system 100, for example.

Alternatively, the processor 203 and other components of the route mapping application module 107a-n can operate in accordance with the defined data retrieval and/or uploading technologies, protocols and policies of the data source it is referencing—i.e., upload or download features of a mapping service, such as mapping service 113 and associated geographical database 119, or network platform service a data source, such as route determination platform 111 or context data sources 109, of system 100, for example.

In one embodiment, the user interface module 207 of the route mapping application module 107a-n can enable presentment of a graphical user interface for presenting the routing information on a display of the user device UE 101a-n, for example. The user interface module 207 can generates the interface in response to application programming interfaces (APIs) or other function calls corresponding to operating system of the user devices UE 101a-n; thus enabling the display of graphics primitives or route information. It is noted that the processor 203 can also operate in connection with the user interface module 207 or the input/output communication module 209, or other components of the route mapping application module 107a-n, as well as in conjunction with other components of the system 100, as described, to enable the generation of route information or messages for recommending one or more routes, such as via the mapping application to users, such as in response to filtering criteria or user preferences, for example.

Figure 3:
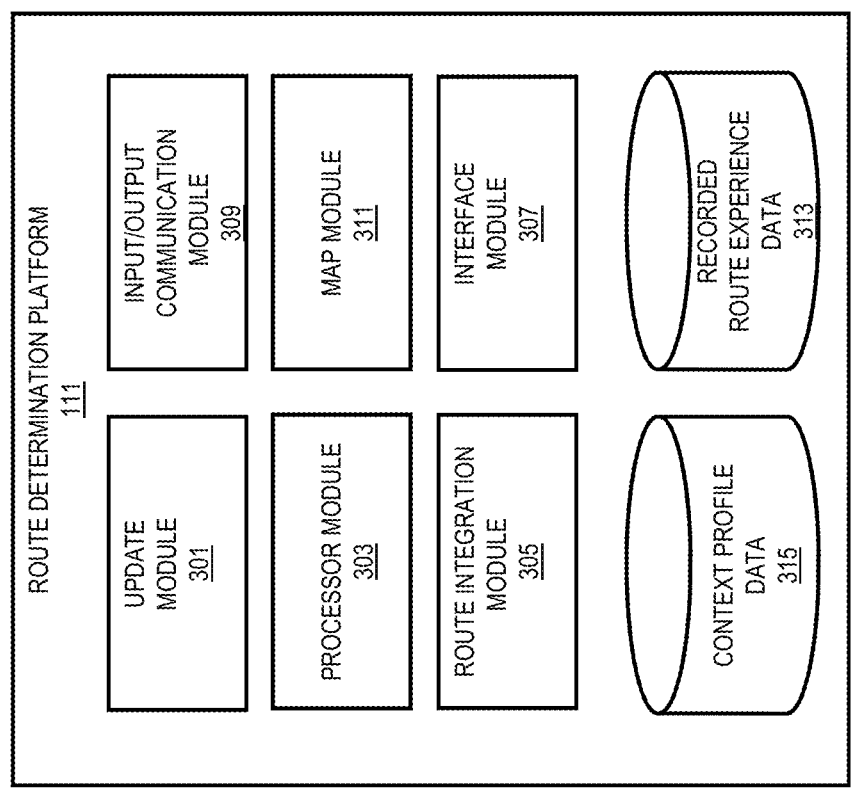
FIG. 3 is a diagram of a route determination platform, such as can be included system of FIG. 1A, according to one embodiment.

FIG. 3 is a diagram of the components of the route determination platform 111, in the system 100, as can be used in the determination of one or more personalized routes or personalized route segment, according to exemplary embodiments. By way of example, the route determination platform 111 can include one or more components for generating one or more calculated routes and calculated route segments and recorded routes and recorded route segments, as well as can perform filtering, and can generate one or more personalized routes or personalized route segments, according to exemplary embodiments. It is contemplated that the functions of these components can be combined in one or more components or performed by other components of equivalent functionality in the system 100, for example. In this embodiment, the route determination platform 111 or module, as can be included as a part of a navigation service provider other service provider that can provide mapping, navigation or route context related services or information, for example. The route determination platform 111, or module, can include, for example, an update module 301, a processor module 303, a route integration module 305, an input/output communication module 309, a map module 311 and an interface module 307.

In addition, the route determination platform 111, or module, can access context profile data regarding one or more users, as described, as can be used for filtering in determination of the personalized routes or personalized route segments from a context profile data storage database 315. The route mapping application platform 111, or module, also can maintain one or more recorded route experience data storage database 313 for storing previously recorded routes of a user or users for determining various of the candidate recorded routes or candidate recorded route segments for determining one or more personalized routes or personalized route segments, according to exemplary embodiments.

In one embodiment, the update module 301 can update user identification information associated with a user or users of the UE 101a-n and can also authenticate users and user devices UE 101a-n, such as for interaction with the route determination platform 111, for determination of one or more personalized routes or personalized route segments. By way of example, the update module 301 can receives a request, such as from a user of the UE 101a-n through the input/out communication module 309 to generate mapping information based on one or more inputs provided by a mapping application, such as can be stored in the map module 311, or can be obtained from the mapping service 113 and associated geographic database 119 for determination of one or more personalized routes or personalized route segments, according to exemplary embodiments. The filtering criteria in a process for generation of the one or more personalized routes or personalized route segments can include a specification of data or data sources for context information as can be obtained from the context profile data storage database 315, as well as can include various preferences and settings information for one or more users or user devices UE 101a-n, including a preferred travel mode, relationship type, default origin and destination, etc., for example. Also, recorded routes, recorded route segments and route preferences as can be used in the determination of the personalized routes and personalized route segments, for one or more users or user devices UE 101a-n, can be stored in the recorded route experience data storage database 313, for example. These preferences and settings can be referenced to a specific user or users of a UE 101a-n, or a specific user device or user devices UE 101a-n, or combination thereof, for example.

The update module 301 can also include receiving and validating a login name and/or user identification value as provided or established for a particular user or UE 101a-n (or host), such as in conjunction with a subscription or registration process with a provider of the route determination platform 111, such as in relation to a personalized route or personalized route segment determination process, according to exemplary embodiments. The login name and/or user identification value can be received as an input provided by the user from UE 101a-n via a graphical user interface, and as can be provided to the route determination platform 111 (e.g., as enabled by the interface module 307 through the input/output communication module 309). The input/output communication module 309 can enable communication with the route application mapping module 107a-n or with other components of the user device UE 101a-n, as well as with other components of the system 100, such as the mapping service 113 and associated geographic database 119 or context data sources 109, via the communication network 105, for example. The authentication or user identification process can also be performed through automated association of profile settings maintained as registration data with an IP address, a carrier detection signal of a user device 101a-n, mobile directory number (MDN), subscriber identity module (SIM) (e.g., of a SIM card), radio frequency identifier (RFID) tag or other identifier, such as for communication of the user device UE 101a-n with other components of the system 100, with the route determination platform 111, for example.

In one embodiment, the update module 301 or input/output communication module 309 can provides input to the processor module 303 in relation to determining one or more personalized routes or personalized route segments. The processor module 303 can determine one or more inputs required for enabling execution of processes for determining one or more personalized routes or personalized route segments including, for example, retrieving map information from the map module 311, recorded route information from the recorded route experience data storage database 313, or context profile data, as can be used for filtering, from the context profile data storage database 315. The processor module 303 can provide and receive information on the recorded routes and recorded route segments from the recorded route experience data storage database 313, and the desired one or more beginning and ending points for the to be determined personalized routes or personalized route segments, such as received from the input/output communication module 309 or from the interface module 307, to the route integration module 305. The route integration module 305 can also receive map information from the map module 311 for determination of the recorded routes and recorded route segments and the calculated routes and calculated route segments, for example.

The route integration module 305 can, alone or in conjunction with the processor 303, integrate recorded routes or recorded route segments having common endpoints with the desired one or more beginning and ending points for determination of candidate routes or candidate route segments for user devices UE 101a-n. The route integration module 305 can enable the generated routing information to be integrated for use with the mapping application of the route mapping application module 107a-n or the mapping service 113, including the executing of various application programming interfaces (APIs) required of the mapping application, for example. The processor 303 can, alone or in or in conjunction with the route integration module 305 determine one or more candidate recorded routes and candidate recorded route segments and one or more calculated routes and calculated route segments, and apply any filtering criterion or criteria to determine the one or more personalized routes or personalized route segments, according to exemplary embodiments. The filtering criterion or criteria can include, for example, one or more of age of the recorded route or recorded route segment, the frequency of travel of the recorded route or recorded route segment, or the context of the at least one recorded route or recorded route segment, such as based on the recorded route or recorded route segment including or meeting context information criteria, according to exemplary embodiments.

The route determination platform 111, such as by the processor 303, can also obtain recorded route, route preference, mapping, geographic and context information from other components of the system 100 for the personalized route or personalized route segment determination, such as though the input/output communication module 309, or in conjunction with interface module 307. Exemplary sources in the system 100 for providing recorded route, route preference, mapping, geographic and context information, can be obtained, such as from the route mapping application module 107a-n, the mapping service 113 and associated geographic database 119 or from the context data sources 109, such as via the communication network 105, for example. The input/output communication module 309 can relay information and data from and to components of the system 100 and from and to the processor module 303, which can use the received data and information in the determination of the personalized routes or personalized route segments, as described, for example.

Also, according to exemplary embodiments, the determination of the personalized routes or personalized route segments can be determined by the route determination platform 111 alone or in conjunction with various components of the system 100, such by or in conjunction with the user devices UE 101a-n, with the route determination platform 111 receiving routing or context information or route determinations, as described, from the user device UE 101a-n and from other components of the system 100, such as the mapping service 113 and associated geographic database 119 or from context data sources 109, such as via the communication network 105, for example.

In addition to retrieving recorded route experience information and context information, the processor 303 is configured to generate personalized route information based on user input conditions or criteria, such as user route preferences or point of interest data, for example, such as received from the user devices UE 101a-n, by or through the interface module 307 through the update module 301 from the input/output communication module 309, for example. Such user input criteria or conditions can include, for example, one or more experience types, returned theme data corresponding to the experience types, user route preferences, select experience information, the desired origin or origins or beginning points, intermediate destinations or intermediate ending points, the destination or destinations or ending points, or a combination thereof, or other criteria or conditions, for example.

Routing information as generated by the processor 303 can include one or more instructions for guiding the user from various points of interest (POIs) along the determined personalized routes or personalized route segments, such as in relation to corresponding one or more filtering criteria. In addition, the processor 303, such as in conjunction with the map module 311 or the route integration module 305, can generate mapping information for visually depicting the routing information, such as for the personalized routes or personalized route segments, as well as for the calculated routes, calculated route segments, recorded routes or recorded route segments, as juxtaposed against geographic data or in relation to POIs, such as for presentation on a display of a user device, such as on a display of UE 101a-n, for example, according to exemplary embodiments.

Still further, the processor 303 can be configured to process metadata associated with any experience information maintained by the various data sources, such as can be used in conjunction with filtering criteria. The metadata can be interpreted by the processor 303 to determine contextual data associated with the one or more user preferences or POIs, for example. For example, timestamp information related to recorded route information can be interpreted by the processor 303 for determining the most relevant/up-to-date recorded routes or recorded route preferences, such as can be correlated with a restaurant as a point of interest along a personalized route or personalized route segment, or as ending point of a route or route segment, for example. By determining the contextual data, older recorded routes or older recorded route segments, such as to the restaurant, can be avoided for retrieval while those with a more recent timestamp are retrieved accordingly, according to exemplary embodiments.

In yet another embodiment, the processor 303 in conjunction with the context profile data storage database 315 can gather point of interest data determined to relate to the personalized routing request. This can includes generating a correlation between the POIs and experience information, as well as enabling determining of POIs in connection with a given mapping application or service, for example. In addition, the processor 303 can be configured to process contextual information as monitored for the user, one or more other users, or various user devices UE 101a-n associated therewith, such as a user's cell phone personal computer or received from other components of the system 100, for example. Depending on the context information, one or more POIs can be added to or subtracted from a collection of POIs correlated with one or more desired or recorded routes, for example.

It is noted, in certain embodiments, that the functions performed by the various components of the route determination platform 111 can be incorporated, such as those of the processor 303 and the route integration module 305, for example. Furthermore, the process of retrieving POI data or retrieving correlated experience information can be performed concurrently with the retrieval of recorded route information, for example, in the determination of the personalized routes or personalized route segments, for example. Regardless of the implementation, the processor 303 and other components of the route determination platform 111 can employ any known data mining and exchange protocols, languages and network methodologies for pulling from, accessing or referencing information as stored, either on the user device UE 101a-n or on other components of the system 100, for example. In addition, the processor 303 can interact with the interface module 307 to enable the pushing, posting, uploading, or correlating of one or more data items to a data source, such as in system 100, for example.

Alternatively, the processor 303 and other components of the route determination platform 111 can operate in accordance with the defined data retrieval and/or uploading technologies, protocols and policies of the data source it is referencing—i.e., upload or download features of a mapping service, such as mapping service 113 and associated geographical database 119, or a network platform service or a data source, such as those of the context data sources 109, of system 100, for example.

In one embodiment, the interface module 307 of the route determination platform 111 can enable presentment of a graphical user interface for presenting the routing information on a display of the user device UE 101a-n, for example. The interface module 307 can generates the interface in response to application programming interfaces (APIs) or other function calls corresponding to operating system of the user devices UE 101a-n; thus enabling the display of graphics primitives or route information. It is noted that the processor 303 can also operate in connection with the interface module 307 or the input/output communication module 309, or other components of the route determination platform 111, as well as in conjunction with other components of the system 100, as described, to enable the generation of route information or messages for recommending one or more routes, such as via the mapping application to users of user devices UE 101*a-n*, such as in response to filtering criteria or user preferences, for example.

Figure 9:
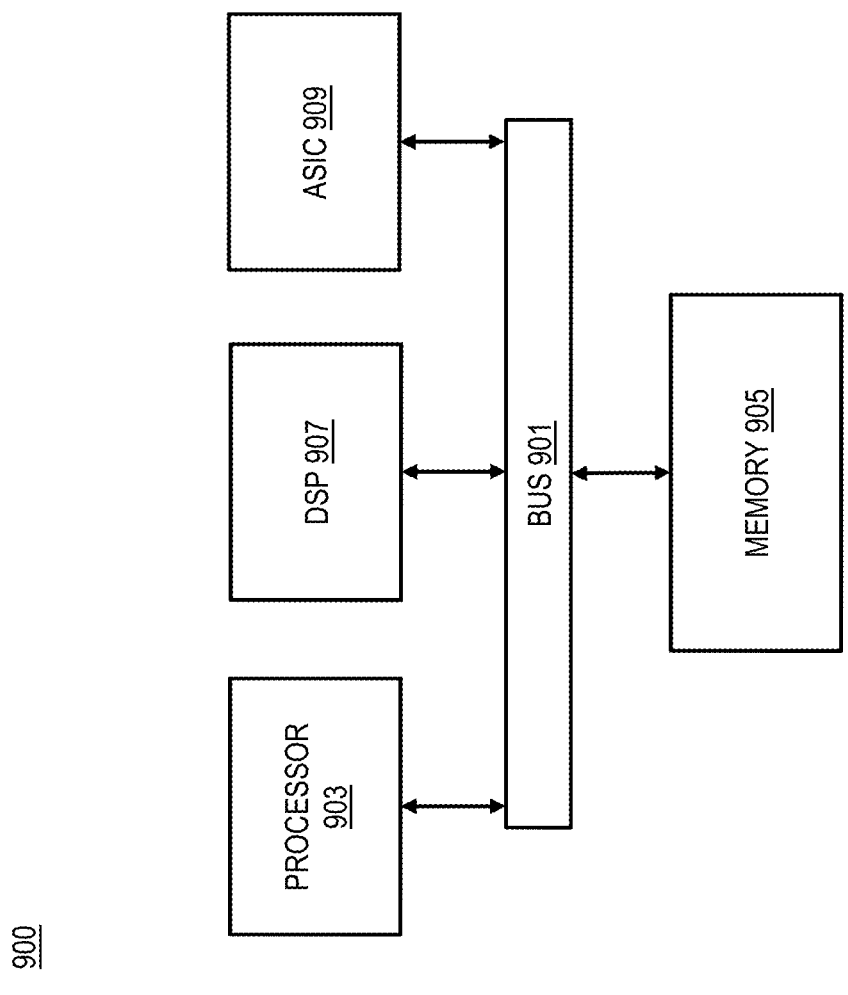
FIG. 9 is a diagram of a chip set that can be used to implement embodiments of the invention.

FIGS. 4A-4D are flowcharts of processes for generating one or more personalized travel routes based on calculated and recorded route experience information related to one or more users, according to various embodiments. In exemplary embodiments, one or more of the processors and memory included in the user equipment 101*a-n*, such as can be included in the route mapping application module 107*a-n*, or included in the route determination platform 111, can alone or in combination, or in combination with other components of the system 100, as described, perform the exemplary processes of FIGS. 4A-4D and can be implemented in, for instance, a chip set including a processor and a memory such as shown in FIG. 9, for example.

Figure 5A:
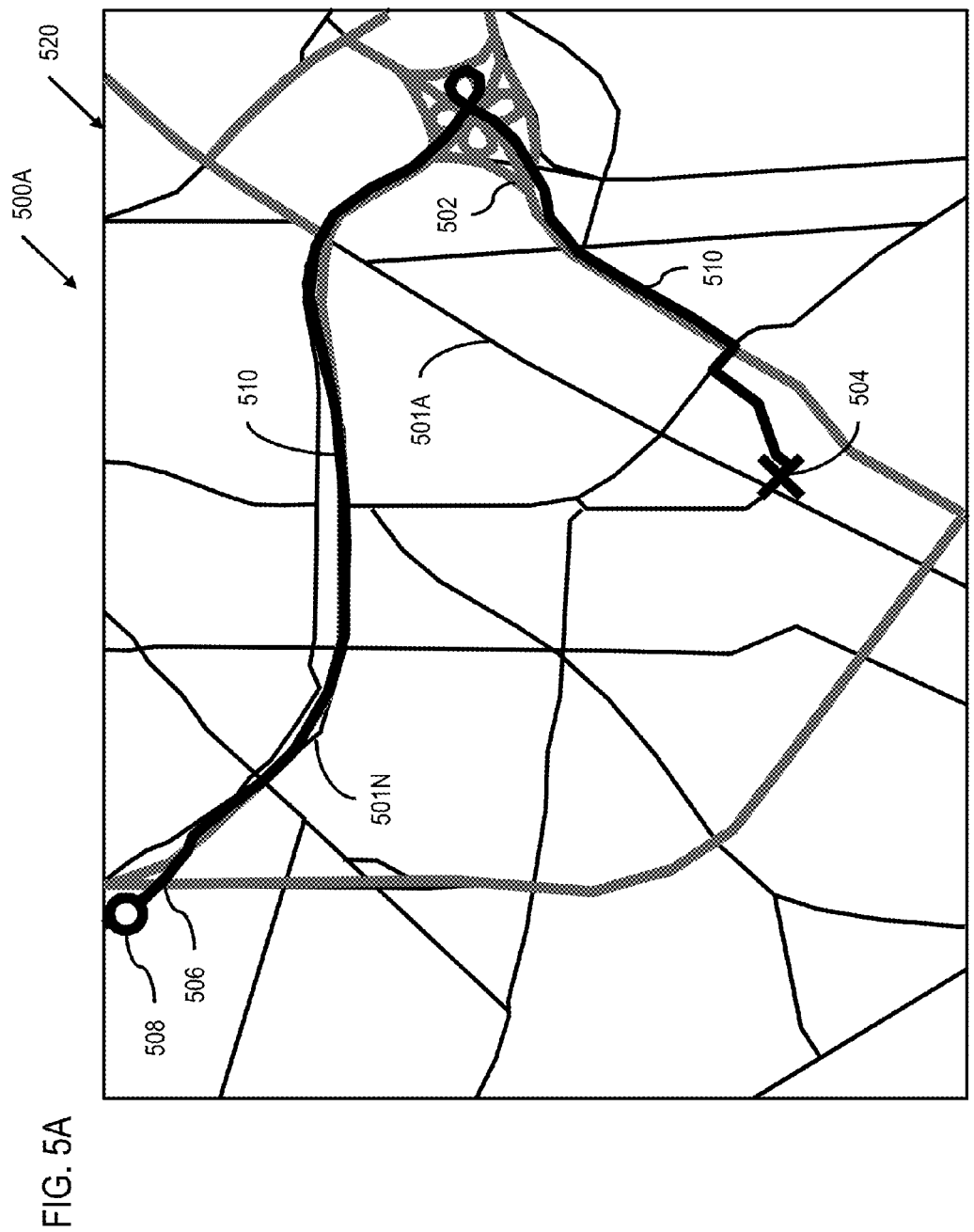
FIGS. 5A and 5B are diagrams of user or device interfaces, such as displays, as can be utilized in illustrating calculated and recorded routes, such as in relation to the processes of FIGS. 4A and 4B, according to various embodiments.
Figure 5B:
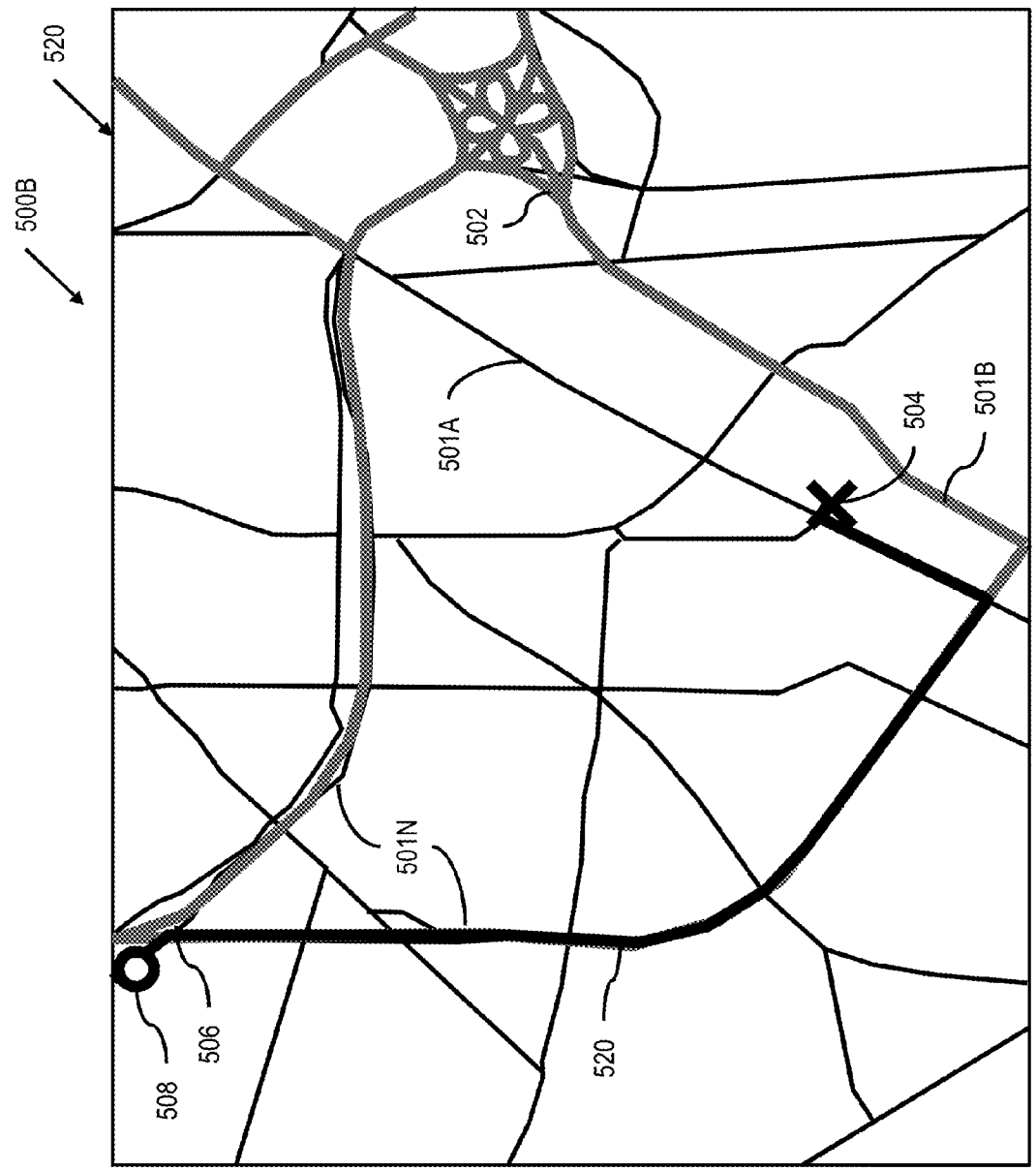
Figure 6A:
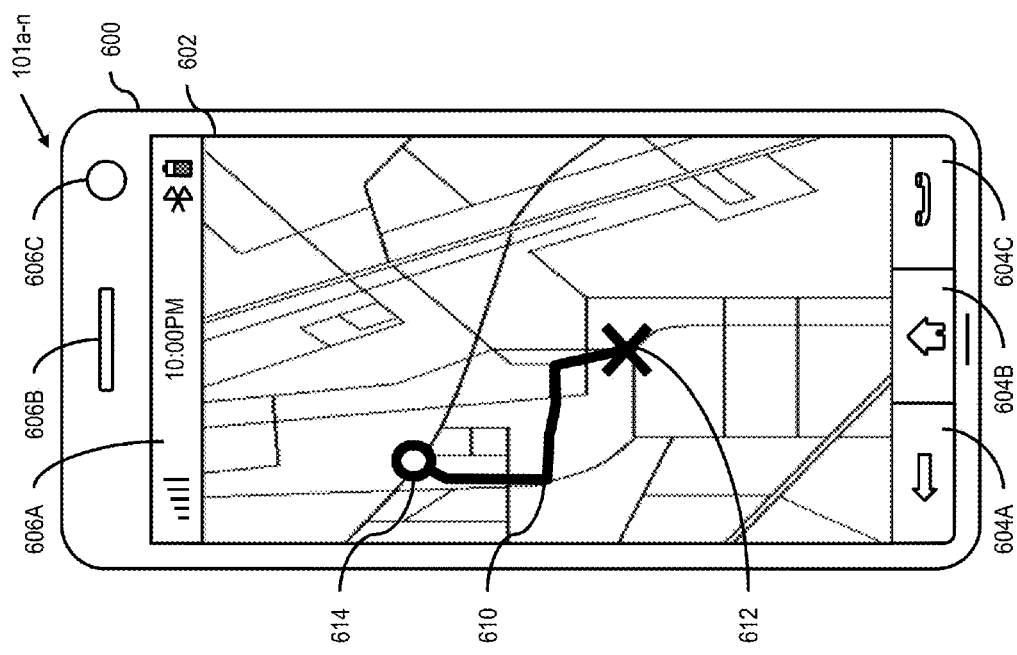
FIGS. 6A-6D are diagrams of user devices including device interfaces, such as displays, as can be utilized in illustrating calculated and recorded routes in relation to the processes of FIGS. 4A and 4B, according to various embodiments.
Figure 6B:
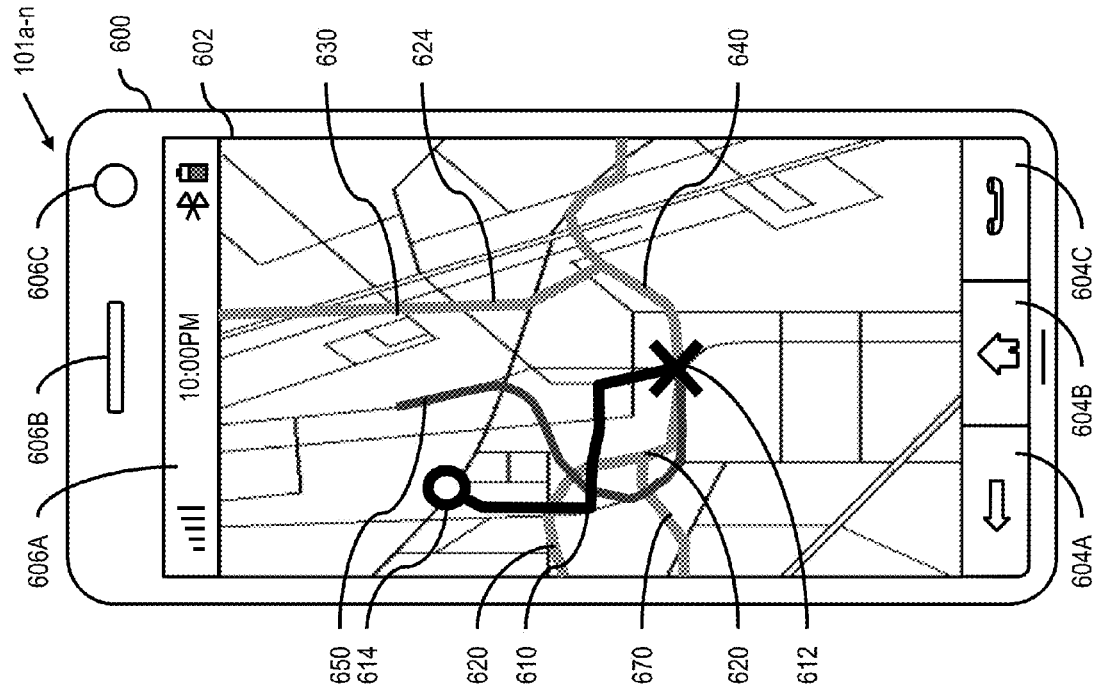
Figure 6C:
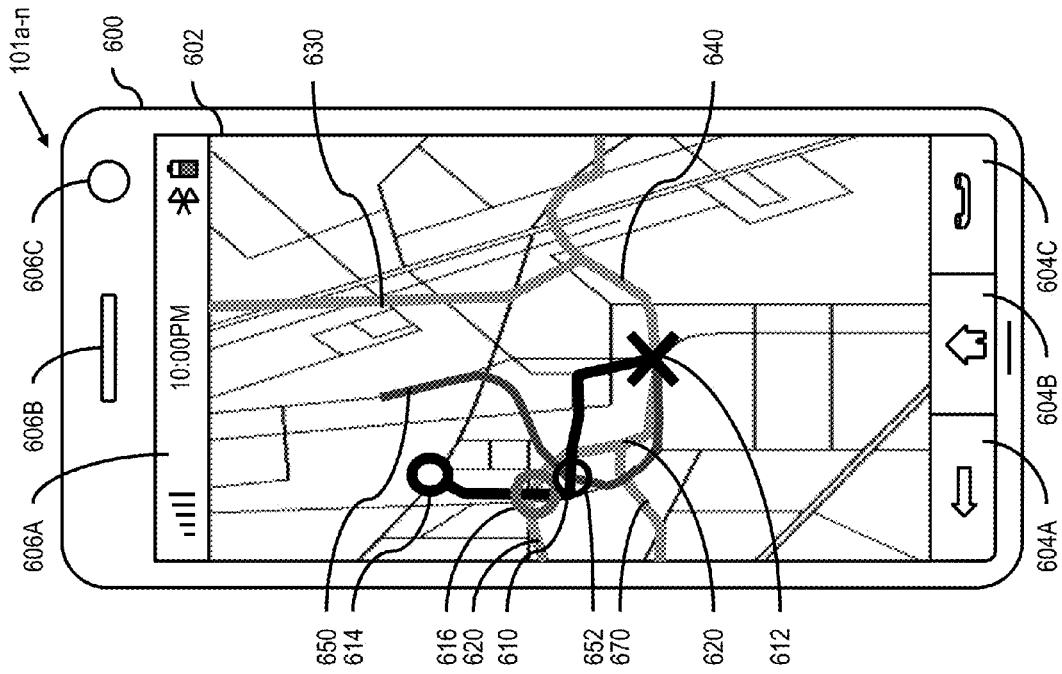
Figure 6D:
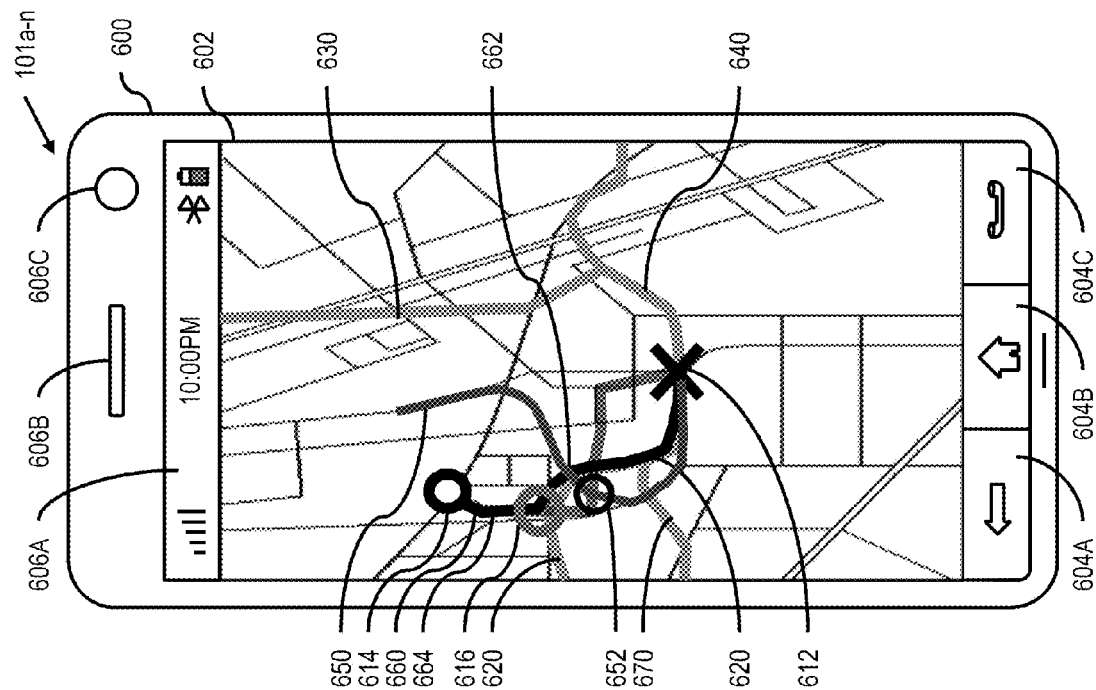
Figure 7:
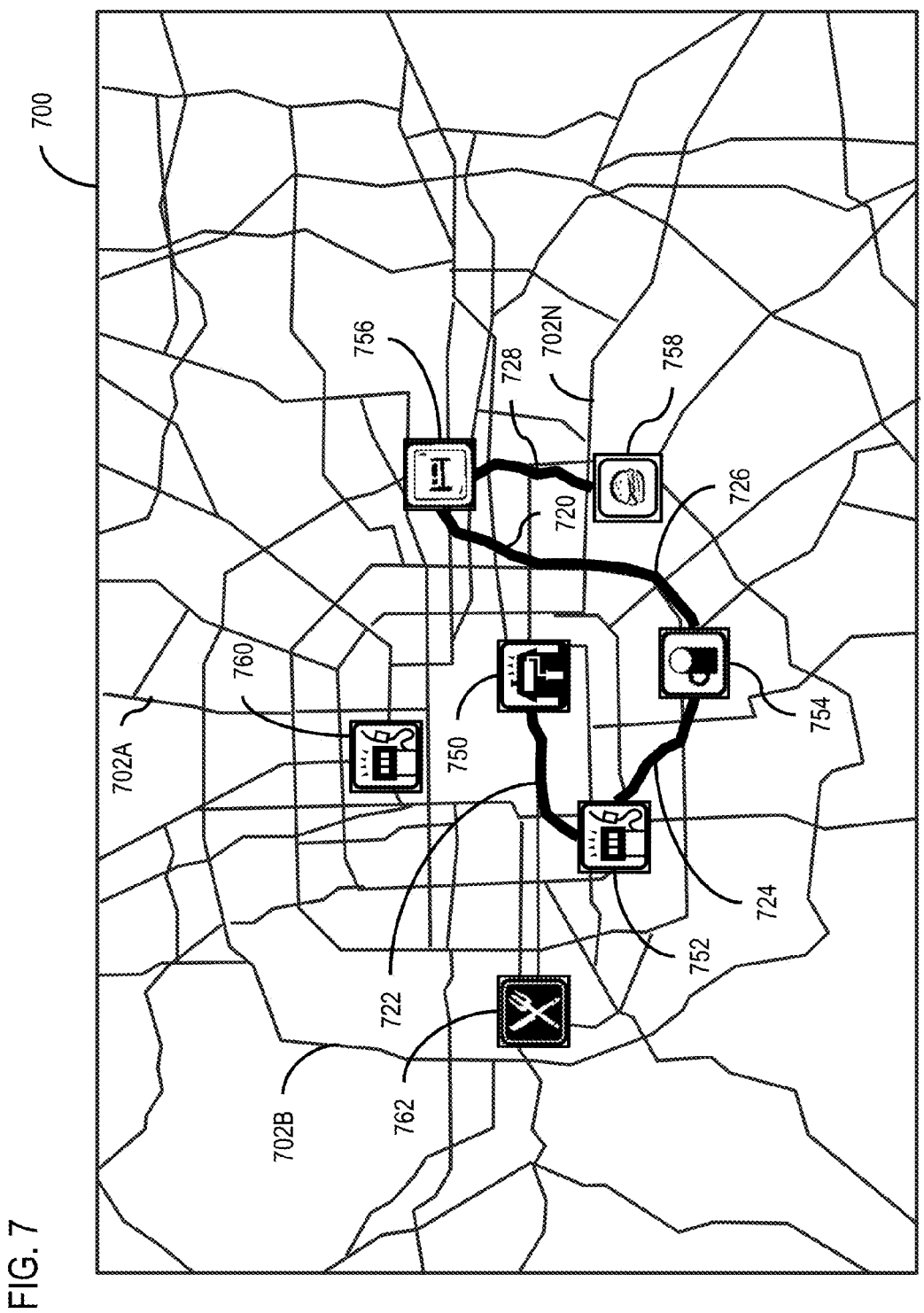
FIG. 7 is a diagram of a user or device interface, such as a display, as can be utilized in illustrating calculated and recorded routes for generating one or more personalized travel routes in relation to the processes of FIGS. 4A and 4B, according to various embodiments.

The processes of FIGS. 4A-4D will be discussed with reference to FIGS. 5A, 5B, 6A-6D and 7, as well as FIGS. 1-3. FIGS. 5A and 5B are diagrams of user or device interfaces, such as displays, as can be utilized in illustrating calculated and recorded routes, FIGS. 6A-6D are diagrams of user devices including device interfaces, such as displays, as can be utilized in illustrating calculated and recorded routes for generating one or more personalized travel routes, and FIG. 7 is a diagram of a user or device interface, such as a display, as can be utilized in illustrating calculated and recorded routes for generating a plurality of personalized travel routes or segments, according to various exemplary embodiments.

FIGS. 5A and 5B illustrate diagrams 500A and 500B of a display interface 520, such as a display of a user device UE 101*a-n* that illustrate a plurality of roads 501A-N on which can be displayed one or more user recorded or calculated routes for determination of personalized routes and personalized route segments. FIG. 5A illustrates a user preferred route 510, such as a route a user frequently uses such as starting from home, at a beginning point 504 to a destination or ending point 508 using a preferred highway entrance 502. However, as illustrated in FIG. 5B, when a user uses a user device, such as UE 101*a-n*, for navigation instructions to ending point 508, the navigation instructions typically send the user on a short or shorter route, either by time or distance, or both, such as by calculated route 520. As shown in FIG. 5B, the calculated route 520 sends the user to a different highway entrance 506, that the user, for one reason or another does not typically prefer to use.

Referring now to FIG. 4A and FIGS. 6A-6D, as well as to FIGS. 1-3, there is described an exemplary process for generating one or more personalized travel routes based on calculated and recorded route information, according to exemplary embodiments. FIGS. 6A-6D illustrates a user device UE 101*a-n*, such as a cell phone or mobile phone, for example. The user device 101*a-n*, also referred to as user device 600 in FIGS. 6A-6D, has a user interface, or display, 602 for displaying information to a user, or on which a user can enter information, such as graphical and route related information. The user device 600 typically has various control touch surfaces or buttons, such as directional controls 604A for locating or inputting information, a home screen control 604B to illustrate a home screen on display 602, and a phone activation control 604C to display an active screen to send and receive phone calls, for example. The user device 600 also includes various indicators 606A, such as for signal strength or battery life or a current time or current date, for example. Further the user device can have additional associated components, such as a speaker 606B or a camera 606C, for example.

Figure 4A:
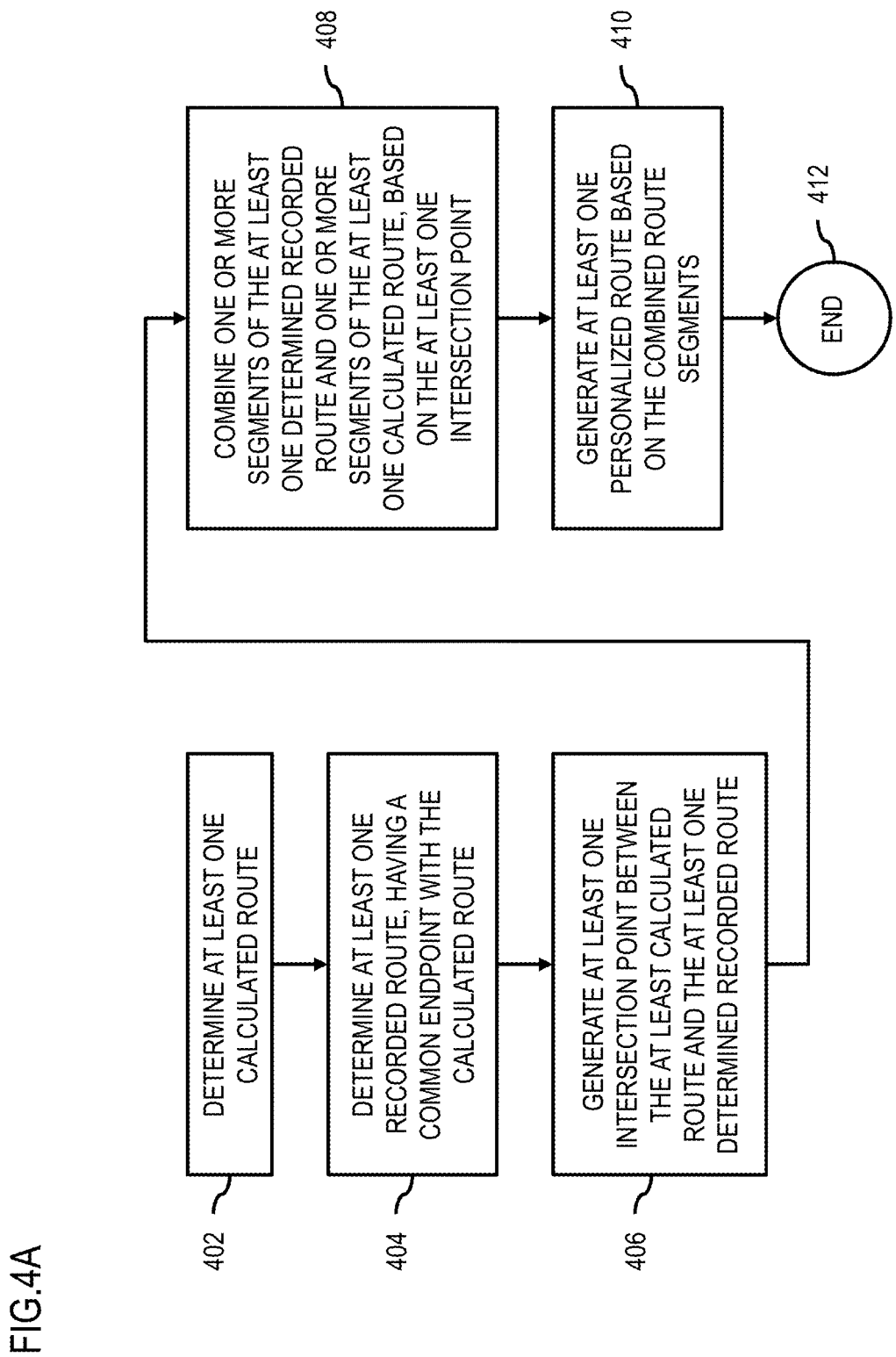
Figure 4B:
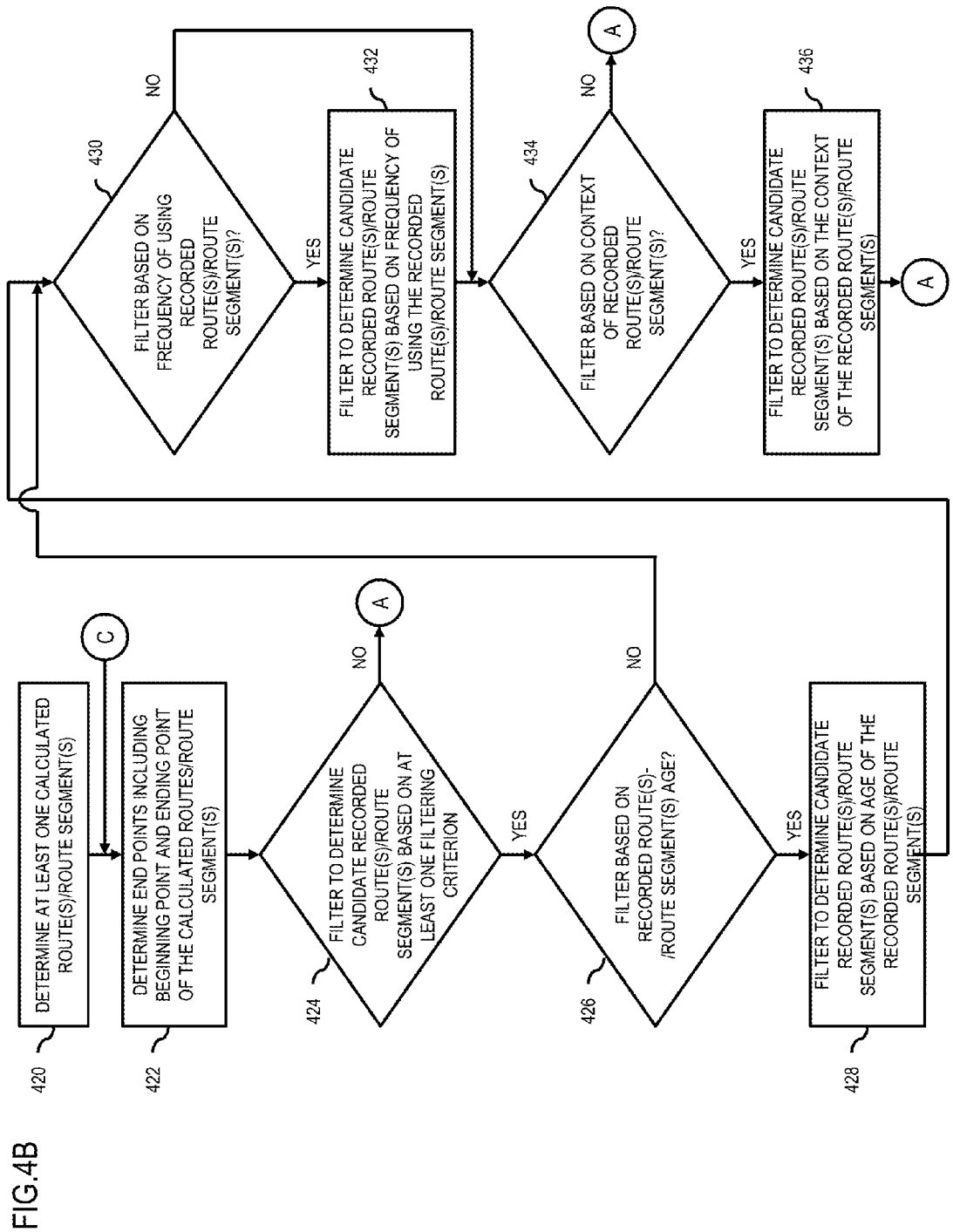
Figure 4C:
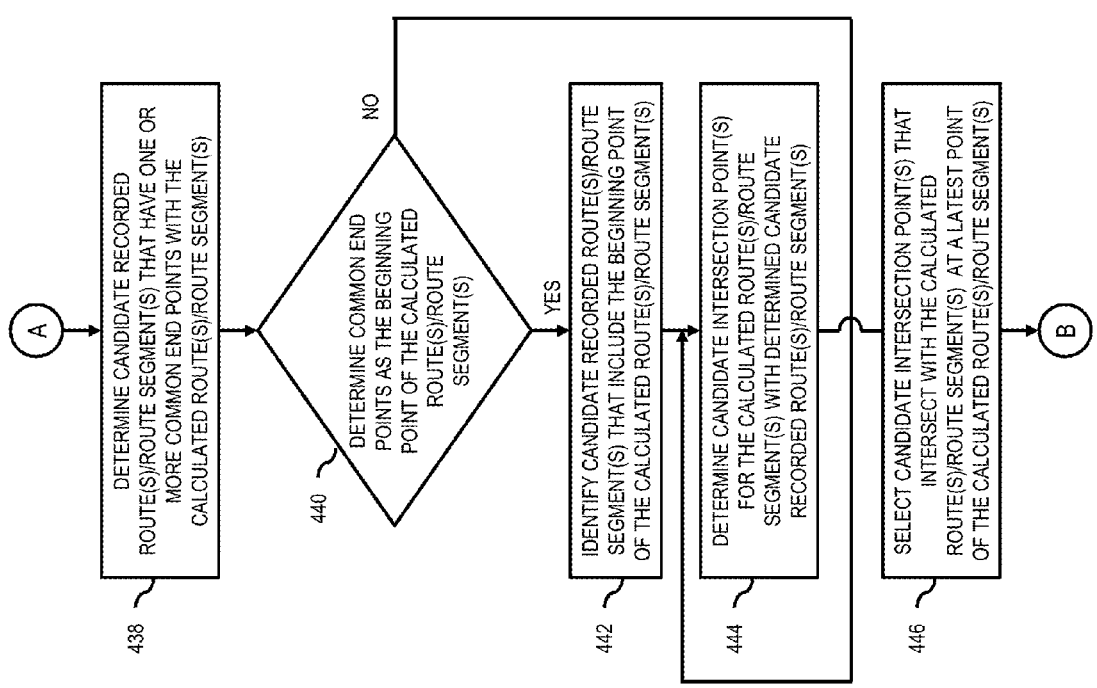

Referring to FIG. 4A, to Step 402, one or more processors and memory, such as of user device UE 101*a-n* or 600 or of system 100, such as of route mapping application module 107*a-n* or the route determination platform 111, individually or in combination, determines at least one calculated route for a user, the calculated route having a beginning point and an ending point. The beginning point can be determined by one or more navigation application programs, based on a user device UE 101*a-n* position, such as determined in conjunction with a GPS. The ending point is typically the desired destination, such as can be entered by a user or determined based on user criteria or context information, for example. FIG. 6A illustrates a calculated route 610 having a beginning point 612 indicated by an "X" and an ending point 614, indicated by a circle "0". In this regard, for route calculation, typically any available digital route planner can be employed, such as an on-board solution on a mobile phone or automotive environment as well as a sophisticated web service for route planning, for example.

The process then proceeds to Step 404. At Step 404, one or more processors and memory, such as of user device UE 101*a-n* or 600 or of system 100, such as of route mapping application module 107*a-n* or the route determination platform 111, individually or in combination, determines at least one recorded route having one or more common endpoints with the calculated route 610. FIG. 6B illustrates a number of recorded routes 620, 630, 640, 650, and 670 that have at least one common endpoint with the calculated route 610. In the illustrated example, the at least one common endpoint shared by the calculated and recorded routes is the beginning point 612, for example. In determining recorded routes, commute routes typically are recorded routes that the user of a user device, such as UE 101*a-n*, drives regularly. Recorded routes can be learned from recording user behavior or manually entered by the user as a recorded route, as a user preference, for example. The recorded routes, such as commuter routes, can also be stored on-board the user device UE 101*a-n* or on a server in the system 100, for example.

The process then proceeds to Step 406. At Step 406, one or more processors and memory, such as of user device UE 101*a-n* or 600 or of system 100, such as of route mapping application module 107*a-n* or the route determination platform 111, individually or in combination, determines to generate at least one intersection point between the at least one calculated route 610 and the at least one recorded routes 620, 630, 640, 650 and 670, having the at least one common endpoint 612. FIG. 6C illustrates those of routes 620, 630, 640, 650 and 670 that intersect with the at least one calculated route 610. As shown in the example of FIG. 6C, recorded route 620 intersects with the calculated route 610 at intersection point 616, and recorded route 650 intersects with calculated route 610 at intersection point 652

The process then proceeds to Step. 408. At Step 408, one or more processors and memory, such as of user device UE 101*a-n* or 600 or of system 100, such as of route mapping application module 107*a-n* or the route determination platform 111, individually or in combination, determines to combine one or more segments of the recorded route 620, 650 with one or more segments of the calculated route 610, based, at least in part, on the at least one intersection point 616, 652. In this regard, the criterion based on the intersection point applied, for example, is choosing the intersection point that is closest to the destination or ending point 614. In this regard, as illustrated in the example of FIG. 6D, the determined intersection point meeting this criterion is the intersection point 616, where recorded route 620 intersects with the calculated route 610. The one or more processors and memory, such as of user device 101*a-n* or 600 or of system 100, such as of route mapping application module 107*a-n* or the route determination platform 111, individually or in combination, determines to combine, as illustrated in FIG. 6D the route segment from recorded route 620 from the beginning point 612 to the intersection point 616 with the route segment from calculated route 610 from the intersection point 616 to the destination or ending point 614.

The process then proceed to Step 410 where one or more processors and memory, such as of user device UE 101*a-n* or 600 or of system 100, such as of route mapping application module 107*a-n* or the route determination platform 111, individually or in combination, causes, at least in part, a generation of at least one personalized route 660 by causing, at least in part, a combination of the one or more segments 662 from the recorded route 620 and one or more segments 664 from the calculated route 610, to generate the personalized route 660 based on the combined route segments 662 and 664, as illustrated in FIG. 6D.

In Steps 408 and 410, for example, one or more processors and memory, such as of user device UE 101*a-n* or 600 or of system 100, such as of route mapping application module 107*a-n* or the route determination platform 111, individually or in combination, causes, at least in part, a generation of at least one personalized route 660 by connecting the recorded route 620 to the calculated route 610 by first cutting off the calculated route 610 at the identified intersection point 616. In this regard, the calculated route segment between the route start point 612 and the intersection point 616 is being removed. The result is only that route segment 664 from the intersection point 616 towards the route destination 616 is retained from the calculated route 610 in forming the personalized route 660, and is also referred to as a RouteSegment, e.g. RouteSegment 664, for example.

Also, the RouteSegment typically corresponds to that part or parts of the initially calculated route or calculated routes that can be used to build the final result or the one or more personalized routes or personalized route segments. Typically, the RouteSegment is the part of the calculated route that lies behind the intersection point, for example, but can vary depending upon the user preference or criteria or context information, for example. Also, a private network typically can refer to the aggregate of all or a substantial portion of a user's recorded routes that have been recorded. Further, a private network can correspond to that part or parts of the existing street network that a user is familiar with and the ways (routes) how a user is usually using it and can include context information and user profile or user route preference information, for example.

Also, in Steps 408 and 410, for example from the recorded routes 620, 630, 640, 650, and 670, or recorded commutes, on the other hand, all recorded commutes or recorded routes are removed but the selected recorded commute for recorded route 620 with the intersection point 616. From that recorded commute or recorded route 620 only the piece or segment between the intersection 616 and endpoint or commute destination of recorded route 620 is removed, which typically is not the same endpoint as endpoint 614, for example. The result is only that piece of the recorded commute or recorded route 620 between the route start point or beginning point 612 and the intersection point 616 is retained, and is also referred to as the CommuteSegment, e.g. CommuteSegment 662, for example.

Further, the CommuteSegment typically corresponds to that part of the user's recorded commutes or recorded routes that can be used to build the final result or the one or more personalized routes or personalized route segments, for example. The CommuteSegment typically is the part or parts of the recorded route or routes that lie before the intersection point and typically start at the route start point, for example, but can be based on various user criteria or user preferences or context information, for example. Also, the intersection point can be any point in the recorded route that intersects with the calculated route, the selected intersection point or intersection points can be based on various user criteria or user preferences or context information, but typically is the last point in the calculated route where it intersects with any of those recorded routes or recorded commutes that have the same start point as the calculated route, for example.

Further in Steps 408 and 410, the new route, or new personalized route, 660 is being created by concatenating the geometry of the CommuteSegment 662 and the RouteSegment 664 becoming the generated personalized route 660, also referred to as the ResultSegment, e.g. ResultSegment 660, geometry, for example. The travel time estimate for each street of the ResultSegment 660 can be built by copying the corresponding time estimates from the RouteSegment 664 and copying the corresponding time recordings from the CommuteSegment 662 (per street). The overall estimated travel time can therefore correspond to the sum of the estimated travel time of the RouteSegment 664 and the recorded travel time of the CommuteSegment 662, for example.

Further, the ResultSegment typically describes the final route result, such as the generated one or more personalized routes or personalized route segments, for example. Also, the ResultSegment is typically what the user of the user device UE 101*a-n* can see then on the display of the navigation device, such as illustrated in FIG. 6D for personalized route 660, for example. The result can therefore be a personalized route that is half "learned from the user" and half calculated based on knowledge of the map data as can be in conjunction with a current traffic situation, according to exemplary embodiments, for example. The process then proceeds to End at Step 412 to await return to Step 402.

Referring now to FIGS. 4B-4D and FIGS. 6A-6D and 7, as well as to FIGS. 1-3, there is described a further exemplary process for generating one or more personalized travel routes based on calculated and recorded route information, according to exemplary embodiments. The process begins at Step 420 where one or more processors and memory, such as of user device UE 101*a-n* or 600 or of system 100, such as of route mapping application module 107*a-n* or the route determination platform 111, individually or in combination, causes, at least in part, a determination of at least one calculated route or calculated route segment. The determination of the calculated route or calculated route segment, such as can be for a plurality of calculated routes or calculated route segments for a plurality of personalized routes or a plurality of personalized route segments, is as described with respect to determining calculated route 610, as illustrated in FIG. 6A, for example. In this regard, FIG. 7 illustrates a personalized route 720 having a plurality of personalized route segments 722-728, for example.

The process then proceeds to Step 422, where one or more processors and memory, such as of user device UE 101*a-n* or 600 or of system 100, such as of route mapping application module 107*a-n* or the route determination platform 111, individually or in combination, causes, at least in part, a determination of end points including one or more beginning points and ending points of the at least one calculated route or calculated route segment. The determination of the beginning and ending points of the at least one calculated route or calculated route segment, such as for a plurality of calculated routes or a plurality of calculated route segments for a plurality of personalized routes or a plurality of personalized route segments, is as described with respect to determining the beginning point 612 and the ending point 614 of the calculated route 610, as illustrated in FIG. 6A, for example. In this regard, FIG. 7 illustrates a personalized route 720 having a plurality of personalized route segments 722-728, where each of the personalized route segments have a corresponding beginning point and ending point that can correspond to a calculated route segment, for example. Also, FIG. 7 illustrates a plurality of streets or roads 702A-N for the routes, as well as various POIs 750-762, for example.

As to Step 422, for example, the personalized route segments 722-728 for the personalized route 720 in FIG. 7 includes the following determined beginning and ending points for the corresponding personalized route segments, for example. Assuming the personalized route 720 starts at a user's home 750, for example, the calculated route segment corresponding to personalized route segment 722 would have a beginning point 750 and an ending point 752, such as at a gas station the user desires to stop on the personalized route 720, to a final destination endpoint of the personalized route 720 at endpoint 758, for example. The calculated route segment corresponding to personalized route segment 724 would have a beginning point 752 and an ending point 754, such as at a beverage or food establishment the user desires to stop on the personalized route 720, for example. The calculated route segment corresponding to personalized route segment 726 would have a beginning point 754 and an ending point 756, such as at a hotel or rest stop the user desires to stop on the personalized route 720. The calculated route segment corresponding to personalized route segment 728 would have a beginning point 756 and an ending point 758, such as at a restaurant the user desires to stop on the personalized route 720, the ending point 758 also being the ending point for the personalized route 720, for example.

From Step 422, the process then proceeds to Step 424 where one or more processors and memory, such as of user device UE 101a-n or 600 or of system 100, such as of route mapping application module 107a-n or the route determination platform 111, individually or in combination, causes, at least in part, a determination of whether to filter to determine candidate recorded routes or candidate recorded route segments. If it is determined not to filter the candidate recorded routes or candidate recorded routes segments, the process proceeds to Step 438. However, if at Step 424 it is determined to filter the candidate recorded routes or candidate recorded route segments the process proceeds to Step 426.

At Step 426, one or more processors and memory, such as of user device UE 101a-n or 600 or of system 100, such as of route mapping application module 107a-n or the route determination platform 111, individually or in combination, causes, at least in part, a determination of whether to filter the candidate recorded routes or candidate recorded route segments based on the age of the at least one candidate recorded route or candidate recorded route segment. If a determination is made not to filter at least one the candidate recorded route or candidate recorded route segment based on the age of the at least one candidate recorded route or candidate recorded route segment, the process proceeds to Step 430. However, if it is determined to filter the at least one candidate recorded route or candidate recorded route segment based on the age of the at least one candidate recorded route or candidate recorded route segment, the process proceeds to Step 428.

At Step 428, one or more processors and memory, such as of user device UE 101a-n or 600 or of system 100, such as of route mapping application module 107a-n or the route determination platform 111, individually or in combination, causes, at least in part, a filtering of at least one candidate recorded route or candidate recorded route segment by applying a filtering criteria based on age of the candidate recorded route or the candidate recorded route segment.

In this regard, for example, in applying the filtering criteria, in addition to a filtering criteria based on age of the recorded route or the recorded route segment, recentness of travel can override the frequency and distance factors, as for example a commute driven constantly last week can be more important than a commute only driven one year ago. Also the filtering criteria can eliminate all recorded routes or recorded route segments older than a predetermined time period, such as six months or a year, from the date the filtering determination is made, or from a travel date, for example. Also, in applying filtering criteria, according to exemplary embodiments, various weighted algorithm can be used for filtering, such as to account for or weight age or frequency of the recorded routes or the recorded route segments, the recorded route distance for the destination or ending point, estimated time of arrival, or other factors, such as context information or criteria, for example.

From Step 428, the process proceeds to Step 430. At Step 430, one or more processors and memory, such as of user device UE 101a-n or 600 or of system 100, such as of route mapping application module 107a-n or the route determination platform 111, individually or in combination, causes, at least in part, a determination of whether to filter the at least one candidate recorded routes or candidate recorded route segments based on the frequency of using the at least one candidate recorded route or candidate recorded route segment. If a determination is made not to filter the at least one candidate recorded route or the candidate recorded route segment based on the frequency of using the at least one candidate recorded route or candidate recorded route segment, the process proceeds to Step 434. However, if it is determined to filter the at least one candidate recorded route or candidate recorded route segment based on the frequency of using the at least one candidate recorded route or candidate recorded route segment, the process proceeds to Step 432.

At Step 432, one or more processors and memory, such as of user device UE 101a-n or 600 or of system 100, such as of route mapping application module 107a-n or the route determination platform 111, individually or in combination, causes, at least in part, a filtering of at least one candidate recorded route or candidate route segment by applying a filtering criteria based on the frequency of using the at least one candidate recorded route or candidate recorded route segment. In this regard, for example, in applying the filtering criteria, frequency of the commute itself can override the distance factor as, for example, a commute driven 90 times could overrule a commute driven only twice. Also, the filtering criteria can eliminate all candidate recorded routes or candidate recorded route segments of less than a predetermined threshold frequency of travel, such as less than a frequency of two or three times over a predetermined period of time, such as measured from the date the filtering determination is made, or from a travel date, for example.

From Step 432, the process proceeds to Step 434. At Step 434, one or more processors and memory, such as of user device UE 101a-n or 600 or of system 100, such as of route mapping application module 107*a*-*n* or the route determination platform 111, individually or in combination, causes, at least in part, a determination of whether to filter the at least one candidate recorded route or candidate recorded route segment based on the context of the at least one candidate recorded route or candidate recorded route segment. If a determination is made not to filter at least one candidate recorded routes or candidate recorded route segment based on the context of the at least one candidate recorded route or candidate recorded route segment, the process proceeds to Step 438. However, if it is determined to filter the at least one the candidate recorded routes or candidate recorded route segment based on the context of the at least one candidate recorded route or candidate recorded route segment, the process proceeds to Step 436.

At Step 436, one or more processors and memory, such as of user device UE 101*a*-*n* or 600 or of system 100, such as of route mapping application module 107*a*-*n* or the route determination platform 111, individually or in combination, causes, at least in part, a filtering of at least one candidate recorded route or candidate route segment by applying a filtering criteria based on the context of the at least one candidate recorded route or candidate recorded route segment. In this regard, for example, in applying the filtering criteria, context filtering criteria can include, for example, as user preferences, POIs, an origin, a destination, a travel modality (e.g., transport type), a travel condition (e.g., preferred arrival time, preferred road type), or other user specified criteria, such as can be input by a user on user device UE 101*a*-*n* or retrieved from a storage, such as the context profile data storage databases 215 or 315 the recorded route experience data databases 213 or 313, or the context data sources 109, or other storage in the system 100, for example. Also, for example, a context filtering criterion, among others, can be a user preference that distance to the route destination can be a primary factor in context filtering criterion. Typically, the frequency and the recentness of traveled routes can be important factors in the personalized route determination, for example.

From Step 436, the process proceeds to Step 438. At Step 438, one or more processors and memory, such as of user device UE 101*a*-*n* or 600 or of system 100, such as of route mapping application module 107*a*-*n* or the route determination platform 111, individually or in combination, causes, at least in part, a determination, such as can be from the at least one candidate recorded route or candidate recorded route segment determined from one or more of the filtering Steps 424-436, at least one candidate recorded route or candidate route segment that has one or more common endpoints with the one or more calculated routes or calculated route segments. In this regard, FIG. 6B illustrates a number of recorded routes 620, 630, 640, 650 and 670 that have at least one common endpoint with the calculated route 610. In the illustrated example, the at least one common endpoint shared by the calculated and recorded routes is the beginning point 612, for example.

Also, as to Step 438, referring to FIG. 7 the personalized route 720 includes a plurality of the personalized route segments 722-728. Each of the personalized route segments 722-728 for the personalized route 720 can include a corresponding calculated route segment, and at least one corresponding candidate recorded route segment, as can be determined as previously described in relation to FIG. 4A and discussed and illustrated as to FIGS. 6A-6D, for example. For example, in FIG. 7 the determined beginning and ending points for the corresponding personalized route segments 722-728 for personalized route 720 can correspond to common endpoints for the one or more of the corresponding calculated route segments or the corresponding recorded route segments, for example. In this regard common endpoints for the corresponding calculated route segments and the corresponding recorded route segments can include, for example point 750 and point 752 as to the personalized route segment 722, point 752 and point 754 as to the personalized route segment 724, point 754 and point 756 as to the personalized route segment 726, and point 756 and point 758 as to the personalized route segment 728.

From Step 438, the process proceeds to Step 440. At Step 440, one or more processors and memory, such as of user device UE 101*a*-*n* or 600 or of system 100, such as of route mapping application module 107*a*-*n* or the route determination platform 111, individually or in combination, causes, at least in part, a determination of whether the common endpoints are determined as the beginning points of the at least one calculated route or calculated route segment. If it is not to be determined that the common endpoints are determined as the beginning points of the at least one calculated route or calculated route segment, the process proceeds to Step 444. However if it is determined at Step 440 that the common endpoints are determined as the beginning points of the at least one calculated route or calculated route segment, the process proceeds to Step 442. Also, if a common endpoint other than the beginning point of the at least one calculated route or calculated route segment is chosen, the process as described herein as to FIG. 4B-4D or 4A for determination for the at least one personalized route or personalized route segment would be applied by treating the designated common point the same as the beginning point for such determination, as discussed and described in relation to the process of FIGS. 4B-4D, for example, according to exemplary embodiments.

At Step 442, one or more processors and memory, such as of user device UE 101*a*-*n* or 600 or of system 100, such as of route mapping application module 107*a*-*n* or the route determination platform 111, individually or in combination, causes, at least in part, a determination to identify one or more candidate recorded routes or candidate route segments that include one or more beginning points of the one or more calculated routes or calculated route segments. In this regard, FIG. 6B illustrates a number of recorded routes 620, 630, 640, 650 and 670 that have at least one common beginning point with the calculated route 610. In the illustrated example, the at least one common beginning point shared by the calculated and recorded routes is the beginning point 612, for example.

Also, as to Step 442, referring to FIG. 7 the personalized route 720 includes a plurality of the personalized route segments 722-728. Each of the personalized route segments 722-728 for the personalized route 720 can include a corresponding calculated route segment, at least one corresponding candidate recorded route segment, and a corresponding beginning point as can be determined as previously described in relation to FIG. 4A and FIGS. 4B-4D and discussed and illustrated as to FIGS. 6A-6D, for example. For example, in FIG. 7 the determined beginning points for the corresponding personalized route segments 722-728 for personalized route 720 can correspond to common beginning points for the one or more of the corresponding calculated route segments or the recorded route segments, for example. In this regard the beginning points for the corresponding calculated route segments and the corresponding recorded route segments can include, for example, beginning point 750 as to the personalized route segment 722, beginning point 752 as to the personalized route segment 724, beginning point 754 as to the personalized route segment 726, and beginning point 756 as to the personalized route segment 728. From Step 442, the process proceeds to Step 444.

At Step 444, one or more processors and memory, such as of user device UE 101a-n or 600 or of system 100, such as of route mapping application module 107a-n or the route determination platform 111, individually or in combination, causes, at least in part, a determination of at least one candidate intersection points for the one or more calculated routes or calculated route segments with one or more of the determined candidate recorded routes or candidate recorded route segments having either at least one common endpoint from Step 440 or a common beginning point from Step 442. FIG. 6C illustrates those of recorded routes 620, 630, 640, 650 and 670 that intersect with the at least one calculated route 610 and have a common end point, such as beginning point 612. As shown in the example of FIG. 6C, recorded route 620 intersects with the calculated route 610 at intersection point 616, and recorded route 650 intersects with calculated route 610 at intersection point 652, for example.

As to Step 444, each of the personalized route segments 722-728 for the personalized route 720 can include a corresponding calculated route segment, and at least one corresponding candidate recorded route segment, having a common endpoint such as a common beginning point, such as beginning point 750 as to the personalized route segment 722, beginning point 752 as to the personalized route segment 724, beginning point 754 as to the personalized route segment 726, and beginning point 756 as to the personalized route segment 728, and one or more corresponding intersection points can be determined for the corresponding calculated route segments with the corresponding recorded route segments for the personalized route segments 722-728 as previously described in relation to FIG. 4A and FIGS. 4B-4D and as discussed and illustrated as to FIGS. 6A-6D, for example. From Step 444 the process proceeds to Step 446.

At Step 446, one or more processors and memory, such as of user device UE 101a-n or 600 or of system 100, such as of route mapping application module 107a-n or the route determination platform 111, individually or in combination, causes, at least in part, a determination, designation or selection of one or more candidate intersection points, as determined from Step 444, that intersect with the one or more calculated routes or calculated route segments at a latest point of the calculated routes or calculated route segments. In this regard, as illustrated and determined in relation to the example of FIG. 6D, the determined intersection point meeting this criterion as being at the latest point of the calculated routes or calculated route segments is the intersection point 616, where recorded route 620 intersects with the calculated route 610. Also, determining a latest intersection point or spot can include checking or determining for the at least one candidate recorded route or candidate route segment for every commute whether it intersects with the calculated route or calculated route segment at a point where both the calculated route or the calculated route segment and the commute recorded route or recorded route segment use the same street into the same direction at some point on the calculated route or calculated route segment, as well as which is the intersection closest to the route destination, for example.

As to Step 446, each of the personalized route segments 722-728 for the personalized route 720 can include a corresponding candidate intersection point for each calculated route segment that intersects with the corresponding one or more candidate recorded routes or candidate recorded route segments at a latest point of the corresponding calculated routes or calculated route segments. Such candidate intersection points for the corresponding personalized route segments 722-728 can be determined as previously described in relation to FIG. 4A and FIGS. 4B-4D and as discussed and illustrated as to FIGS. 6A-6D, for example. From Step 446 the process proceeds to Step 448.

At Step 448, one or more processors and memory, such as of user device UE 101a-n or 600 or of system 100, such as of route mapping application module 107a-n or the route determination platform 111, individually or in combination, causes, at least in part, a determination, or designation of selected one or more of the identified candidate recorded route segments that include the corresponding selected one or more candidate intersection points, as determined from Step 446, as the selected one or more candidate recorded route segments for the corresponding personalized route segment. In this regard, the one or more processors and memory, such as of user device UE 101a-n or 600 or of system 100, such as of route mapping application module 107a-n or the route determination platform 111, individually or in combination, determines to select, as illustrated and described in relation to FIG. 6D, the route segment from recorded route 620 from the beginning point 612 to the intersection point 616 as the selected candidate route segment 662 from the recorded route 620 for forming a corresponding route segment of personalized route 660, for example.

As to Step 448, each of the personalized route segments 722-728 for the personalized route 720 can include a corresponding selected candidate route segment for each corresponding candidate recorded route or candidate recorded route segment that includes the corresponding selected at least one candidate intersection point, as determined from Step 446, for forming a corresponding route segment of personalized route 720. Such selected recorded route segments for the corresponding personalized route segments 722-728 can be determined as previously described in relation to FIG. 4A and FIGS. 4B-4D and as discussed and illustrated as to FIGS. 6A-6D, for example. From Step 448 the process proceeds to Step 450.

At Step 450, one or more processors and memory, such as of user device UE 101a-n or 600 or of system 100, such as of route mapping application module 107a-n or the route determination platform 111, individually or in combination, causes, at least in part, a determination or generation of at least one personalized route or personalized route segment including at least one first route segment of the at least one designated selected recorded route segment from the corresponding common end point or corresponding common beginning point of the corresponding calculated route or calculated route segment with the corresponding designated selected recorded route segment to the corresponding selected intersection point, as determined form Step 448, and including at least one second route segment from the corresponding calculated route or calculated route segment from the corresponding selected candidate intersection point to the ending point of the corresponding calculated route or calculated route segment. In this regard, the one or more processors and memory, such as of user device UE 101a-n or 600 or of system 100, such as of route mapping application module 107a-n or the route determination platform 111, individually or in combination, determines to generate or combine, as illustrated and described in relation to FIG. 6D, the route segment from recorded route 620 from the beginning point 612 to the intersection point 616 with the route segment from calculated route 610 from the intersection point 616 to the destination or ending point 614, for example.

As to Step 450, each of the personalized route segments 722-728 for the personalized route 720 can be formed to include a corresponding at least one personalized route segment including a determination or generation of at least one corresponding personalized route segment including at least one corresponding first route segment of the at least one corresponding designated selected recorded route segment from the corresponding common end point or corresponding common beginning point of the corresponding calculated route or calculated route segment with the corresponding designated selected recorded route segment to the corresponding selected candidate intersection point, as determined from Step 448, and including at least corresponding one second route segment from the corresponding calculated route or calculated route segment from the corresponding selected candidate intersection point to the ending point of the corresponding calculated route or calculated route segment, for forming a corresponding personalized route segment of personalized route 720. Such selected recorded route segments and calculated route segments for the corresponding first and second route segments for the corresponding personalized route segments 722-728 can be determined as previously described in relation to FIG. 4A and FIGS. 4B-4D and as discussed and illustrated as to FIGS. 6A-6D, for example. From Step 450 the process proceeds to Step 452.

At Step 452, one or more processors and memory, such as of user device UE 101*a-n* or 600 or of system 100, such as of route mapping application module 107*a-n* or the route determination platform 111, individually or in combination, causes, at least in part, a determination of whether a plurality of personalized route segments and corresponding calculated route segments are to be determined, such as where the at least one personalized route includes a plurality of personalized route segments and the at least one calculated route includes a plurality of calculated route segments, for example. If a plurality of personalized route segments or a plurality of calculated route segments is not to be determined, the process proceeds to End at Step 456, to await return to Step 420. However, if at Step 452, a plurality of personalized route segments or a plurality of calculated route segments is to be determined, the process proceeds to Step 454.

At Step 454, one or more processors and memory, such as of user device UE 101*a-n* or 600 or of system 100, such as of route mapping application module 107*a-n* or the route determination platform 111, individually or in combination, causes, at least in part, a determination of whether a personalized route segment has been generated for each of the plurality of calculated route segments, such as where the generation of the at least one personalized route includes causing, at least in part, for each personalized route segment, a combination of one or more segments of the at least one recorded route with the corresponding calculated route segment based, at least in part, on the at least one intersection point between the calculated route segment and at least one recorded route segment, for example. If a personalized route segment has been generated for each of the plurality of calculated route segments, the process proceeds to End at Step 456 to await return to Step 420. However, if a personalized route segment has not been generated for each of the plurality of calculated route segments, the process proceeds to Step 422 and proceeds as previously described.

As can be seen from the above discussion in relation to FIGS. 4A and 4B-4D, the methods and apparatus, according to exemplary embodiments, can provide a navigation solution that is typically relatively simple to implement, and can enhance the learning effect in relation to being relatively immediate as to application and relatively easy for the user of a user device UE 101*a-n* to comprehend for implementing navigation, such as based on user experience from a user's recorded routes, for example, and as can be influenced by user preferences or context, as described. Also, the exemplary algorithms, processes and apparatus, as described in the disclosure herein, such as in relation to the exemplary embodiments, that are not known in the art, can, with the knowledge of the disclosure herein, be combined or incorporated with and implemented in conjunction with existing route planners or navigation devices, programs or applications, such as by one skilled in the art, for example.

In this regard, for example, the way a typical digital map works and is constructed can be applied in route calculation, according to exemplary embodiments. For example, a street or route can be a digital element on its own—that can have a length that can have a defined storage, as well as can have a defined end point and a defined time to travel. In route determination, the methods, processes and apparatus, as described in relation to exemplary embodiments, can be applied to multiple lists of such types of digital elements to determine the various route segments and intersection points, such as by finding corresponding elements in two or more lists, for example.

Also, the methods, apparatus and processes described herein, in relation to the exemplary embodiments, can enhance and facilitate the ability of a user of a user device UE 101*a-n* for navigation to promote locating a route that is familiar or comfortable to a user, such as based on a user's commuting patterns, irrespective of whether it is the fastest route or a route to avoid traffic, such as can be based on other factors for user preferences, such as based on a user's travel history, for example.

Also, according to exemplary embodiments, the methods, processes and apparatus as described in relation to FIGS. 4A and 4B-4D, in determining one or more personalized routes or personalized route segments, can dynamically adjust to re-determine a personalized route or personalized route segment, such as where the user, while traveling, desires to bypass, change or add one or more route destinations or endpoints, for example.

The processes described herein for generating one or more personalized routes for travel based on calculated and recorded route experience information or context information can be advantageously implemented via software, hardware, firmware or a combination of software and/or firmware and/or hardware. For example, the processes described herein, can be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 8:
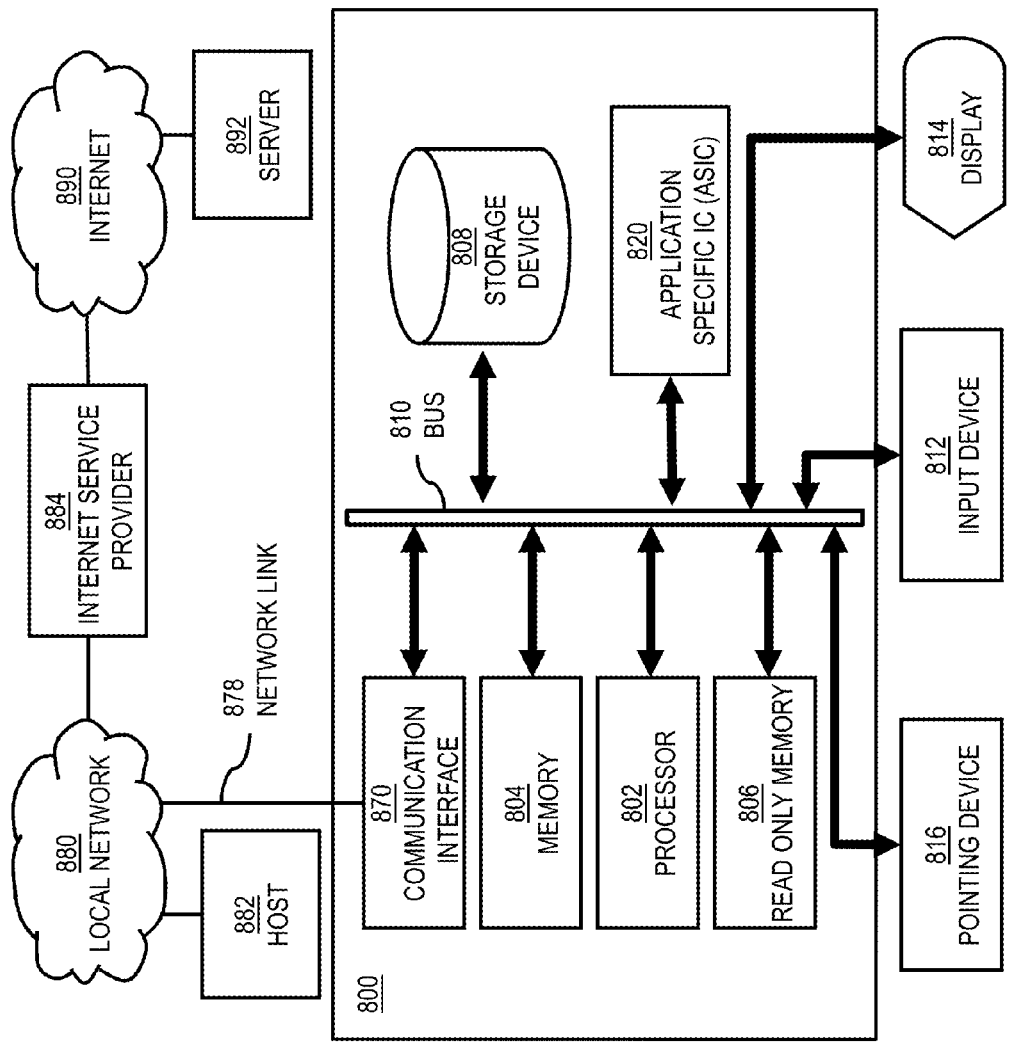
FIG. 8 is a diagram of hardware that can be used to implement embodiments of the invention.

FIG. 8 illustrates a computer system 800 upon which one or more exemplary embodiments of the invention can be implemented, for determining one or more personalized routes or personalized route segments, as described herein. Although computer system 800 is depicted with respect to a particular device or equipment, it is contemplated that other devices or equipment (e.g., network elements, servers, etc.) within FIG. 8 can deploy the illustrated hardware and components of computer system 800. Computer system 800 is programmed (e.g., via computer program code or instructions) to provide for determining one or more personalized routes or personalized route segments, as described herein, and includes a communication mechanism such as a bus 810 for passing information and data between other internal and external components of the computer system 800. Computer system 800, or a portion thereof, constitutes a means for performing one or more steps for determining one or more personalized routes or personalized route segments, as described herein, according to exemplary embodiments.

A bus 810 includes one or more parallel conductors of information so that information is transferred quickly among devices coupled to the bus 810. One or more processors 802 for processing information are coupled with the bus 810.

A processor (or multiple processors) 802 performs a set of operations on information as specified by computer program code related to providing or determining one or more personalized routes or personalized route segments, as described herein, according to exemplary embodiments. The computer program code is a set of instructions or statements providing instructions for the operation of the processor and/or the computer system to perform specified functions. The code, for example, can be written in a computer programming language that is compiled into a native instruction set of the processor. The code can also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors can be implemented as mechanical, electrical, magnetic, optical, chemical or quantum components, among others, alone or in combination.

Computer system 800 also includes a memory 804 coupled to bus 810. The memory 804, such as a random access memory (RAM) or any other dynamic storage device, stores information including processor instructions such as for determining one or more personalized routes or personalized route segments, as described herein, according to exemplary embodiments. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or any other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for determining one or more personalized routes or personalized route segments, as described herein, according to exemplary embodiments, is provided to the bus 810 for use by the processor 802 from an external input device 812, such as a keyboard containing alphanumeric keys operated by a human user. Other external devices coupled to bus 810, used primarily for interacting with humans, include a display device 814, such as a cathode ray tube (CRT), a liquid crystal display (LCD), a light emitting diode (LED) display, an organic LED (OLED) display, a plasma screen, or a printer for presenting text or images, and a pointing device 816, such as a mouse, a trackball, cursor direction keys, or a motion sensor, for controlling a position of a small cursor image presented on the display 814 and issuing commands associated with graphical elements presented on the display 814. In some embodiments, for example, in embodiments in which the computer system 800 can perform all functions automatically without human input, one or more of external input device 812, display device 814 and pointing device 816 can be omitted, for example.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of ASICs include graphics accelerator cards for generating images for display 814, cryptographic boards for encrypting and decrypting messages sent over a network, speech recognition, and interfaces to special external devices, such can perform some complex sequence of operations that are more efficiently implemented in hardware.

Computer system 800 also includes one or more instances of a communications interface 870 coupled to bus 810. Communication interface 870 provides a one-way or two-way communication coupling to a variety of external devices that operate with their own processors, such as printers, scanners and external disks. In general the coupling is with a network link 878 that is connected to a local network 880 to which a variety of external devices with their own processors are connected. For example, communication interface 870 can be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 can be a local area network (LAN) card to provide a data communication connection to a compatible LAN, such as Ethernet. Wireless links can also be implemented. For wireless links, the communications interface 870 sends or receives or both sends and receives electrical, acoustic or electromagnetic signals, including infrared and optical signals, which carry information streams, such as digital data. For example, in wireless handheld devices, such as mobile telephones like cell phones, the communications interface 870 includes a radio band electromagnetic transmitter and receiver called a radio transceiver. In certain embodiments, the communications interface 870 can enable connection to the communication network 105 (FIG. 1) for determining one or more personalized routes or personalized route segments, as described herein, according to exemplary embodiments.

The term "computer-readable medium" as used herein refers to any medium that participates in providing information to processor 802, including instructions for execution. Such a medium can take many forms, including, but not limited to computer-readable storage medium (e.g., non-volatile media, volatile media), and transmission media. Non-transitory media, such as non-volatile media, include, for example, optical or magnetic disks, such as storage device 808. Volatile media include, for example, dynamic memory 804. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 820.

Network link 878 typically provides information communication using transmission media through one or more networks to other devices that use or process the information. For example, network link 878 can provide a connection through local network 880 to a host computer 882 or to equipment 884 operated by an Internet Service Provider (ISP). ISP equipment 884 in turn provides data communication services through the public, world-wide packet-switching communication network of networks now commonly referred to as the Internet 890.

A computer called a server host 892 connected to the Internet hosts a process that provides a service in response to information received over the Internet. For example, server host 892 hosts a process that provides information representing video data for presentation at display 814. It is contemplated that the components of system 800 can be deployed in various configurations within other computer systems, e.g., host 882 and server 892.

At least some embodiments of the invention are related to the use of computer system 800 for implementing some or all of the techniques described herein. According to one embodiment of the invention, those techniques are performed by computer system 800 in response to processor 802 executing one or more sequences of one or more processor instructions contained in memory 804. Such instructions, also called computer instructions, software and program code, can be read into memory 804 from another computer-readable medium such as storage device 808 or network link 878. Execution of the sequences of instructions contained in memory 804 causes processor 802 to perform one or more of the method steps described herein. In alternative embodiments, hardware, such as ASIC 820, can be used in place of or in combination with software to implement the invention. Thus, embodiments of the invention are not limited to any specific combination of hardware and software, unless otherwise explicitly stated herein.

The signals transmitted over network link 878 and other networks through communications interface 870, carry information to and from computer system 800. Computer system 800 can send and receive information, including program code, through the networks 880, 890 among others, through network link 878 and communications interface 870. In an example using the Internet 890, a server host 892 transmits program code for a particular application, requested by a message sent from computer 800, through Internet 890, ISP equipment 884, local network 880 and communications interface 870. The received code can be executed by processor 802 as it is received, or can be stored in memory 804 or in storage device 808 or any other non-volatile storage for later execution, or both. In this manner, computer system 800 can obtain application program code in the form of signals on a carrier wave, for example.

Various forms of computer readable media can be involved in carrying one or more sequence of instructions or data or both to processor 802 for execution. For example, instructions and data can initially be carried on a magnetic disk of a remote computer such as host 882. The remote computer loads the instructions and data into its dynamic memory and sends the instructions and data over a telephone line using a modem, for example. A modem local to the computer system 800 receives the instructions and data on a telephone line and uses an infra-red transmitter to convert the instructions and data to a signal on an infra-red carrier wave serving as the network link 878. An infrared detector serving as communications interface 870 receives the instructions and data carried in the infrared signal and places information representing the instructions and data onto bus 810. Bus 810 carries the information to memory 804 from which processor 802 retrieves and executes the instructions using some of the data sent with the instructions. The instructions and data received in memory 804 can optionally be stored on storage device 808, either before or after execution by the processor 802.

FIG. 9 illustrates a chip set or chip 900 upon which various exemplary embodiments of the invention can be implemented for determining one or more personalized routes or personalized route segments, as described herein. Chip set 900 can be programmed to implement determining one or more personalized routes or personalized route segments, according to exemplary embodiments, as described herein, and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 900 can be implemented in a single chip. It is further contemplated that in certain embodiments the chip set or chip 900 can be implemented as a single "system on a chip." It is further contemplated that in certain embodiments a separate ASIC would not be used, for example, and that all relevant functions as disclosed herein would be performed by a processor or processors. Chip set or chip 900, or a portion thereof, can constitute a means for performing one or more steps of providing user interface navigation information associated with the availability of functions. Chip set or chip 900, or a portion thereof, can constitute a means for performing one or more steps for determining one or more personalized routes or personalized route segments, as described herein, according to exemplary embodiments.

In one embodiment, the chip set or chip 900 includes a communication mechanism such as a bus 901 for passing information among the components of and from and to the chip set 900. A processor 903 has connectivity to the bus 901 to execute instructions and process information stored in, for example, a memory 905. The processor 903 can include one or more processing cores with each core configured to perform independently. A multi-core processor enables multiprocessing within a single physical package. Examples of a multi-core processor include two, four, eight, or greater numbers of processing cores. Alternatively or in addition, the processor 903 can include one or more microprocessors configured in tandem via the bus 901 to enable independent execution of instructions, pipelining, and multithreading. The processor 903 can also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a more general purpose processor. Other specialized components to aid in performing the inventive functions described herein can include one or more field programmable gate arrays (FPGA), one or more controllers, or one or more other special-purpose computer chips, for example.

In one embodiment, the chip set or chip 900 can include merely one or more processors and some software and/or firmware supporting and/or relating to and/or for the one or more processors.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein for determining one or more personalized routes or personalized route segments, as described herein, according to exemplary embodiments. The memory 905 also stores the data associated with or generated by the execution of the inventive steps.

Figure 10:
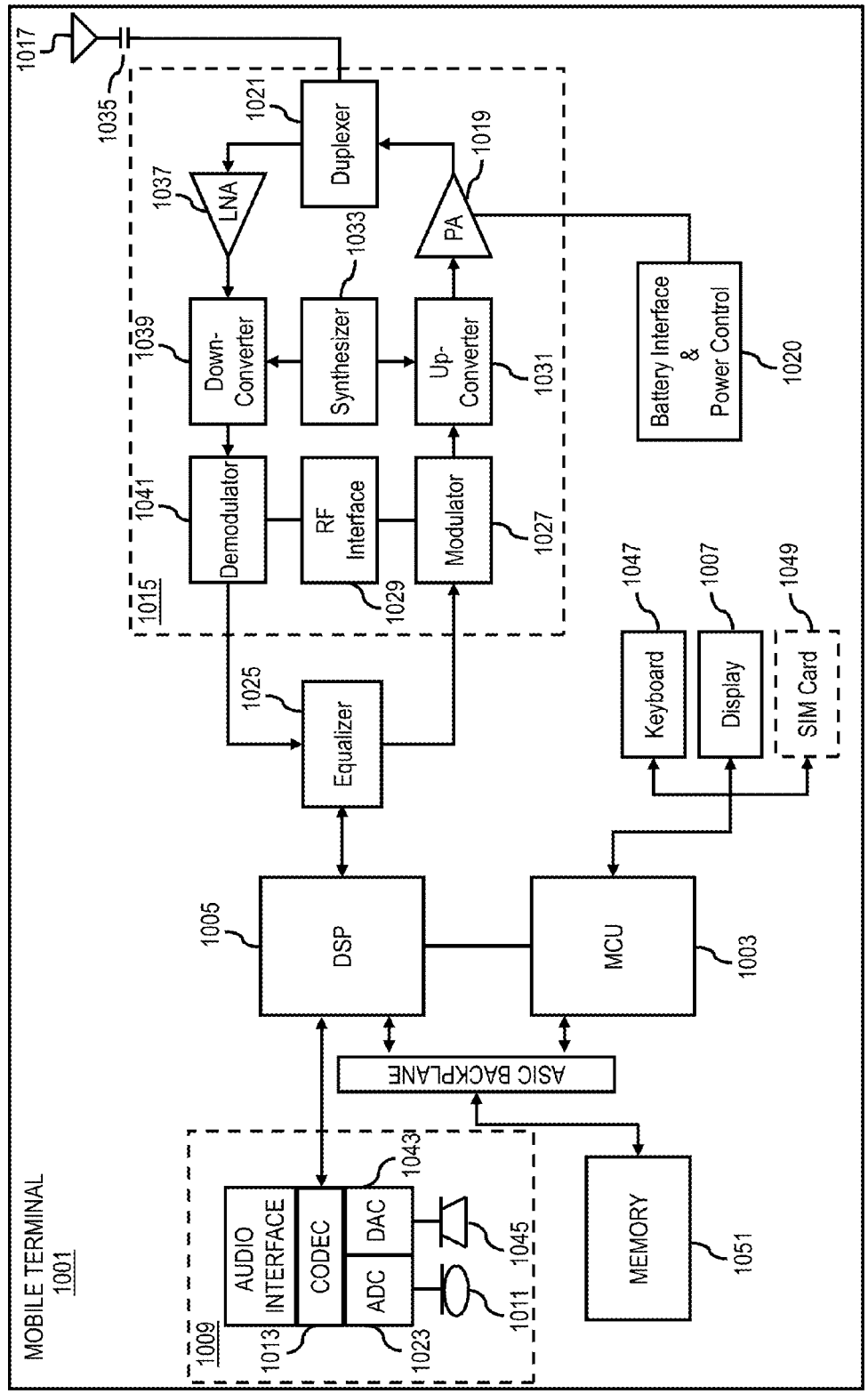
FIG. 10 is a diagram of a mobile terminal (e.g., handset) that can be used to implement embodiments of the invention.

FIG. 10 is a diagram of exemplary components of a mobile terminal 1001 (e.g., handset) for communications, which is capable of operating in the system of FIG. 1, according to various embodiments, such as user equipment 101*a-n*, such as for determining one or more personalized routes or personalized route segments, as described herein. In some embodiments, mobile terminal 1001, or a portion thereof, can constitute a means for performing one or more steps for determining one or more personalized routes or personalized route segments, as described herein, according to exemplary embodiments. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile terminal functions that perform or support the steps for determining one or more personalized routes or personalized route segments, as described herein, according to exemplary embodiments. The display 1007 includes display circuitry configured to display at least a portion of a user interface of the mobile terminal (e.g., mobile telephone). Additionally, the display 1007 and display circuitry are configured to facilitate user control of at least some functions of the mobile terminal. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile terminal 1001 speaks into the microphone 1011 and his or her voice along with any detected background noise is converted into an analog voltage. The analog voltage is then converted into a digital signal through the Analog to Digital Converter (ADC) 1023. The MCU 1003 routes the digital signal into the DSP 1005 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof, for example.

The encoded signals are then routed to an equalizer 1025 for compensation of any frequency-dependent impairments that occur during transmission though the air, such as phase and amplitude distortion. After equalizing the bit stream, the modulator 1027 combines the signal with a RF signal generated in the RF interface 1029. The modulator 1027 typically generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals can be forwarded from there to a remote telephone which can be another cellular telephone, any other mobile phone or a land-line connected to a Public Switched Telephone Network (PSTN), or other telephony networks.

Voice signals transmitted to the mobile terminal 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003 which can be implemented as a Central Processing Unit (CPU), for example.

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile terminal 1001, such as for determining one or more personalized routes or personalized route segments, as described herein, according to exemplary embodiments. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the mobile terminal 1001. The DSP 1005 can, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile terminal 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable storage medium known in the art. The memory device 1051 cam be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1049 can carry, for instance, important information, such as the cellular phone number, the carrier supplying service, subscription details, and security information. The SIM card 1049 serves primarily to identify the mobile terminal 1001 on a radio network. The card 1049 typically also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
    determining at least one intersection point between at least one calculated route and at least one recorded route, wherein the at least one calculated route and the at least one recorded route include, at least in part, one or more common endpoints;
    generating at least one personalized route, based, at least in part, on a combination of one or more segments of the at least one recorded route with one or more other segments of the at least one calculated route based, at least in part, on the at least one intersection point;
    determining a beginning point and an ending point for the at least one calculated route as the one or more common endpoints;
    identifying one or more of the at least one recorded route that includes the beginning point for the calculated route; and
    selecting the identified at least one recorded route that intersects with the calculated route at the intersection point that is located at a latest point of the calculated route to the ending point.

2. The method of claim 1, further comprising:
    generating one or more candidate intersection points with respect to the at least one calculated route for one or more candidate recorded routes that include, at least in part, the one or more common endpoints;
    selecting one of the generated one or more candidate intersection points that intersects the at least one calculated route at a latest point; and
    designating the selected one of the one or more candidate intersection points as the at least one recorded route for generating the at least one personalized route.

3. The method of claim 2, further comprising:
    filtering the at least one recorded route based, at least in part, on at least one filtering criterion to determine the one or more candidate recorded routes.

4. The method of claim 3, wherein the at least one filtering criterion includes one or more of an age of the at least one recorded route, a frequency of using the at least one recorded route, or a context of the at least one recorded route.

5. The method of claim 1, further comprising:
    generating the at least one personalized route as including a first route segment of the selected identified at least one recorded route from the beginning point to the intersection point and including a second route segment from the calculated route from the intersection point to the ending point.

6. The method of claim 5, further comprising:

filtering the at least one recorded route to select for the identification of the one or more of the at least one recorded route based, at least in part, on at least one filtering criterion.

7. The method of claim 1, further comprising:

generating the at least one personalized route for each personalized route segment based, at least in part, on a combination of one or more segments of the at least one recorded route with a corresponding calculated route segment based, at least in part, on the at least one intersection point between the calculated route segment and at least one recorded route segment.

8. The method of claim 7, further comprising:

filtering the at least one recorded route to select, for the combination of the one or more segments of the at least one recorded route with the corresponding calculated route segment, the one or more of the at least one recorded route based on at least one filtering criterion.

9. An apparatus comprising:

at least one processor; and at least one memory including computer program code for one or more programs, the at least one memory and the computer program code configured to, with the at least one processor, cause the apparatus to perform at least the following:

cause, at least in part, a determination of at least one intersection point between at least one calculated route and at least one recorded route, wherein the at least one calculated route and the at least one recorded route include, at least in part, one or more common endpoints;

cause, at least in part, a generation of at least one personalized route based, at least in part, on a combination of one or more segments of the at least one recorded route with one or more other segments of the at least one calculated route based, at least in part, on the at least one intersection point;

cause, at least in part, a determination of a beginning point and an ending point for the at least one calculated route as the one or more common endpoints;

cause, at least in part, an identification of one or more of the at least one recorded route that includes the beginning point for the calculated route; and cause, at least in part, a selection of the identified at least one recorded route that intersects with the calculated route at the intersection point that is located at a latest point of the calculated route to the ending point.

10. The apparatus of claim 9, wherein the apparatus is further caused to:

cause, at least in part, a generation of one or more candidate intersection points with respect to the at least one calculated route for one or more candidate recorded routes that include, at least in part, the one or more common endpoints;

cause, at least in part, a selection of one of the generated one or more candidate intersection points that intersects the at least one calculated route at a latest point; and cause, at least in part, a designation of the selected one of the one or more candidate intersection points as the at least one recorded route for the generation of the at least one personalized route.

11. The apparatus of claim 9, wherein the apparatus is further caused to:

cause, at least in part, a filtering of the at least one recorded route based, at least in part, on at least one filtering criterion to determine the one or more candidate recorded routes.

12. The apparatus of claim 11, wherein the at least one filtering criterion includes one or more of the age of the at least one recorded route, a frequency of using the at least one recorded route, or a context of the at least one recorded route.

13. The apparatus of claim 9, wherein the apparatus is further caused to:

cause, at least in part, a generation of at least one personalized route as including a first route segment of the selected identified at least one recorded route from the beginning point to the intersection point and including a second route segment from the calculated route from the intersection point to the ending point.

14. The apparatus of claim 13, wherein the apparatus is further caused to:

cause, at least in part, a filtering of the at least one recorded route to select for the identification the one or more of the at least one recorded route based on at least one filtering criterion.

15. The apparatus of claim 9, wherein the apparatus is further caused to:

cause, at least in part, a generation of the at least one personalized route based, at least in part, on a combination of one or more segments of the at least one recorded route with the corresponding calculated route segment based, at least in part, on the at least one intersection point between the calculated route segment and at least one recorded route segment.

16. The apparatus of claim 15, wherein the apparatus is further caused to:

cause, at least in part, a filtering of the at least one recorded route to select, for the combination of the one or more segments of the at least one recorded route with the corresponding calculated route segment, the one or more of the at least one recorded route based on at least one filtering criterion.

* * * * *